(12) United States Patent
Suematsu et al.

(10) Patent No.: US 6,915,529 B1
(45) Date of Patent: Jul. 5, 2005

(54) MILLIWAVE TRANSMITTING DEVICE, MILLIWAVE RECEIVING DEVICE AND MILLIWAVE TRANSMISSION AND RECEPTION SYSTEM CAPABLE OF SIMPLIFYING WIRING OF A RECEIVING SYSTEM OF TERRESTRIAL BROADCASTING SERVICE AND SATELLITE BROADCASTING SERVICE

(75) Inventors: Eiji Suematsu, Nara (JP); Hiroya Sato, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 09/257,947

(22) Filed: Feb. 26, 1999

(30) Foreign Application Priority Data

Feb. 27, 1998 (JP) .......................................... 10-047222
Aug. 19, 1998 (JP) .......................................... 10-232949

(51) Int. Cl.[7] ............................................... H04N 7/18
(52) U.S. Cl. .......................... 725/78; 725/81; 725/83; 725/85; 455/41; 455/3.01; 455/88
(58) Field of Search .............................. 725/73, 78–85; 455/41, 3.01, 3.03, 88, 117

(56) References Cited

U.S. PATENT DOCUMENTS

| | | | | | |
|---|---|---|---|---|---|
| 5,101,499 | A | * | 3/1992 | Streck et al. ................... | 455/4 |
| 5,410,749 | A | * | 4/1995 | Siwiak et al. ................. | 455/280 |
| 5,503,960 | A | * | 4/1996 | Hulderman et al. ......... | 430/313 |
| 5,613,191 | A | * | 3/1997 | Hylton ......................... | 455/3.1 |
| 5,636,211 | A | * | 6/1997 | Newlin et al. ............... | 370/465 |
| 5,708,961 | A | * | 1/1998 | Hylton et al. ................. | 725/81 |
| 5,712,602 | A | | 1/1998 | Suematsu | |
| 5,715,020 | A | * | 2/1998 | Kuroiwa et al. ............. | 348/734 |
| 5,793,413 | A | * | 8/1998 | Hylton et al. ................. | 725/81 |
| 5,835,128 | A | * | 11/1998 | Macdonald et al. .......... | 725/81 |
| 5,875,212 | A | * | 2/1999 | Fleek et al. .................. | 375/329 |
| 5,880,721 | A | * | 3/1999 | Yen .............................. | 725/81 |
| 5,903,322 | A | * | 5/1999 | Chen ........................... | 348/723 |
| 5,929,718 | A | * | 7/1999 | Crosby ....................... | 333/24 R |
| 5,953,045 | A | * | 9/1999 | Tanishima ................... | 725/119 |
| 6,008,770 | A | * | 12/1999 | Sugawara .................... | 343/767 |
| 6,008,771 | A | * | 12/1999 | Tanaka et al. ............... | 343/767 |
| 6,008,777 | A | * | 12/1999 | Yiu .............................. | 345/2.1 |
| 6,111,882 | A | * | 8/2000 | Yamamoto ................... | 370/399 |
| 6,121,931 | A | * | 9/2000 | Levi ...................... | 343/700 MS |
| 6,134,419 | A | * | 10/2000 | Williams ..................... | 725/151 |
| 6,175,860 | B1 | * | 1/2001 | Gaucher ...................... | 709/208 |
| 6,218,989 | B1 | * | 4/2001 | Schneider et al. ..... | 343/700 MS |
| 6,259,891 | B1 | * | 7/2001 | Allen .......................... | 455/3.02 |
| 6,268,781 | B1 | * | 7/2001 | Schaffner ..................... | 333/26 |
| 6,282,714 | B1 | * | 8/2001 | Ghori et al. .................. | 725/81 |
| 6,292,181 | B1 | * | 9/2001 | Banerjee et al. ............. | 345/179 |
| 6,493,875 | B1 | * | 12/2002 | Eames et al. ................. | 725/81 |
| 6,522,640 | B2 | * | 2/2003 | Liebenow ................... | 370/338 |

FOREIGN PATENT DOCUMENTS

| | | |
|---|---|---|
| DE | 41 28 947 A1 | 3/1993 |
| DE | 297 19 893 U1 | 1/1998 |
| EP | 0 873 014 A1 | 10/1998 |

* cited by examiner

Primary Examiner—John Miller
Assistant Examiner—Annan Q. Shang
(74) Attorney, Agent, or Firm—Birch, Stewart, Kolasch & Birch, LLP

(57) ABSTRACT

In conventionally receiving satellite broadcasting (BS, CS) and terrestrial broadcasting (VHF, UHF) services, transmitting the services to a plurality of TV receivers in an individual house results in complicated wiring and a community house is also limited in the number of installed TV receivers due to previously setting a distributor and thus requires an additional distributor to be installed when a TV receiver is additionally installed. The milliwave receiving and transmitting system of the present invention allows a broadcast signal to be transmitted and received indoors via indoor, wireless milliwave transmission without using any indoor wiring.

26 Claims, 17 Drawing Sheets

SIGNAL INPUT TO FREQUENCY ARRANGER

OUTPUT FROM FREQUENCY ARRANGER

OUTPUT FROM MILLIWAVE UP-CONVERTER

OUTPUT FROM INVERSE FREQUENCY ARRANGER

SIGNAL INPUT TO FREQUENCY ARRANGER

SIGNAL OUTPUT FROM FREQUENCY ARRANGER

OUTPUT FROM INVERSE FREQUENCY ARRANGER

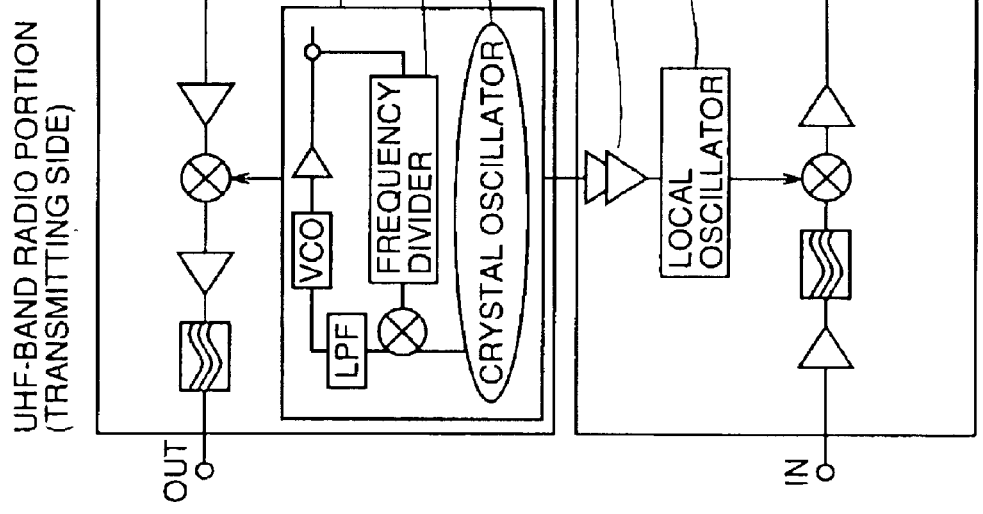
FIG.9B UHF-BAND RADIO PORTION (TRANSMITTING SIDE)
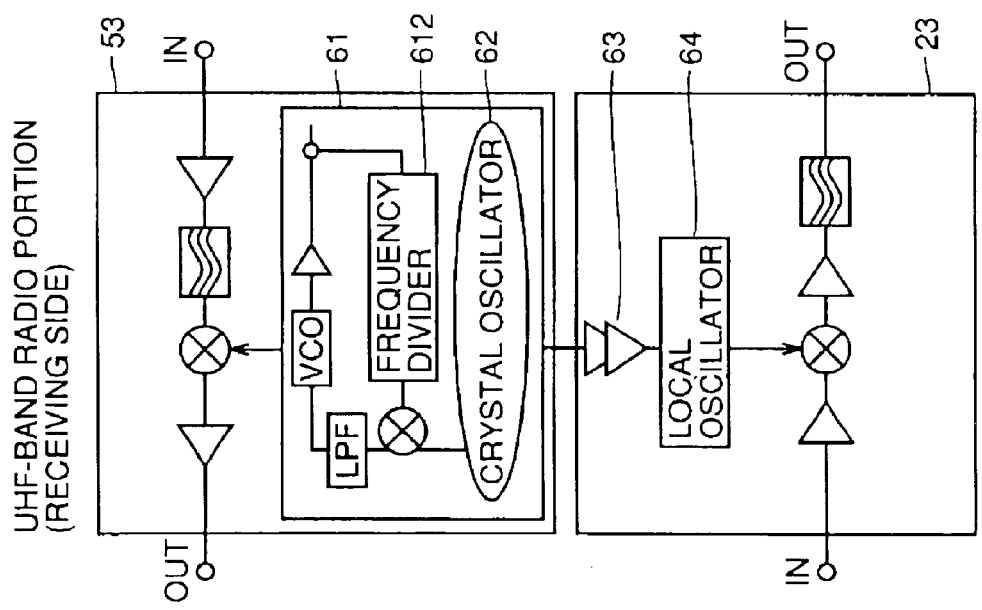
FIG.9A UHF-BAND RADIO PORTION (RECEIVING SIDE)

90: IF OP LEVEL ADJUSTING AMP
91: FREQUENCY ARRANGER
92: IF AMP FOR FREQUENCY COMPENSATION
93: MILLIWAVE UP-CONVERTER

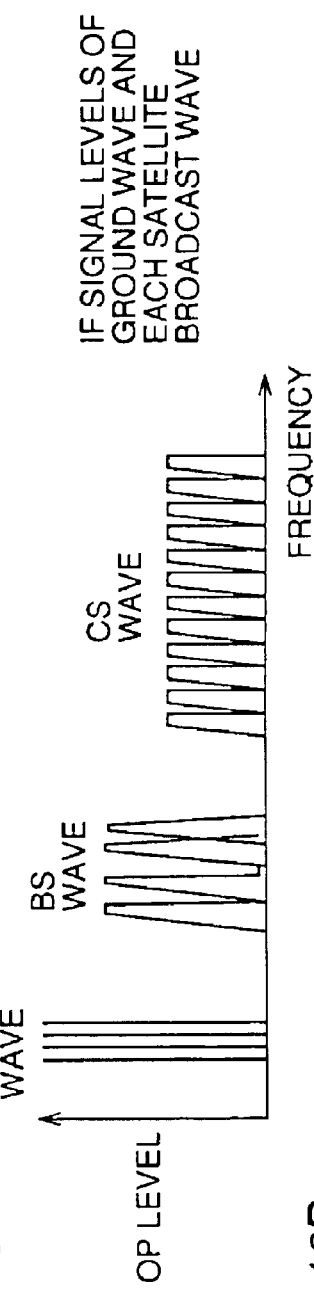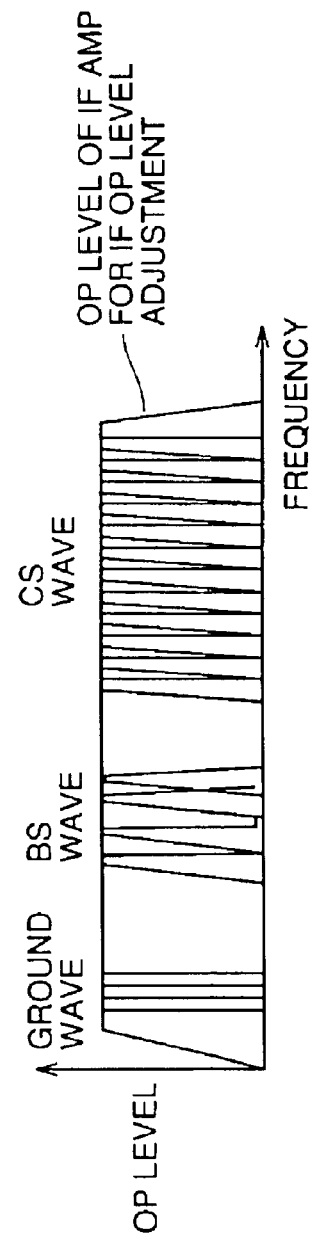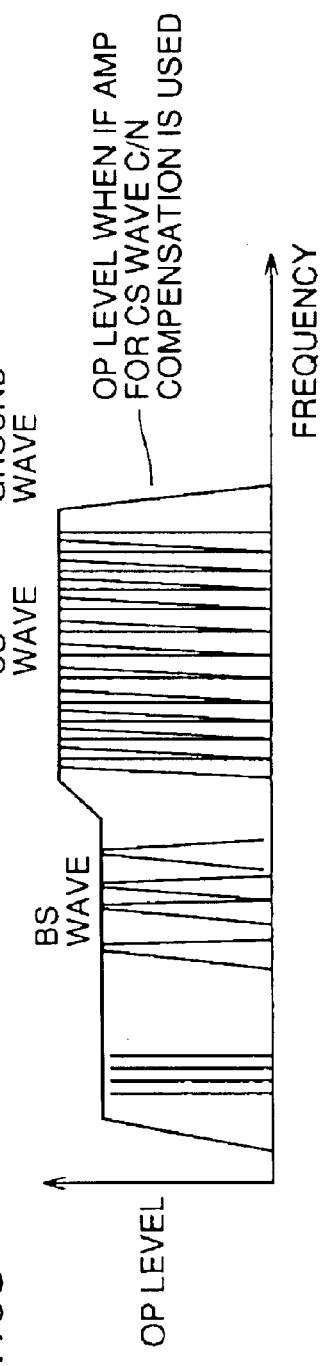

MILLIWAVE TRANSMITTING DEVICE, MILLIWAVE RECEIVING DEVICE AND MILLIWAVE TRANSMISSION AND RECEPTION SYSTEM CAPABLE OF SIMPLIFYING WIRING OF A RECEIVING SYSTEM OF TERRESTRIAL BROADCASTING SERVICE AND SATELLITE BROADCASTING SERVICE

BACKGROUND OF THE INVENTION

1. Field of the Invention

The invention relates to a milliwave transmitting device, milliwave receiving device, milliwave transmission and reception system and electrical appliance for indoor, wireless, milliwave transmission of a plurality of broadcast waves e.g. of terrestrial broadcasting service including VHF broadcasting, UHF broadcasting and the like, and satellite broadcasting service including BS (Broadcasting Satellite) broadcasting, CS (Communication Satellite) broadcasting and the like.

2. Description of the Background Art

Currently there have been implemented TV broadcasting in a plurality of electronic-wave bands, such as terrestrial broadcasting service (VHF, UHF), satellite broadcasting service (BS, CS) and the like.

FIG. 17 shows a conventional configuration of a TV broadcast receiving system 900 in an individual house.

For satellite broadcasting service, TV broadcast receiving system 900 receives a signal of 12 GHz in band at a BS antenna 1 at a CS antenna 2. A low-noise converter 3 attached close to each antenna converts a received electronic wave into a signal of an intermediate-frequency band of one to two GHz. The converted signal is transmitted from outdoors via each of coaxial cables 4 and 5 to an indoor TV receiver 6 (BS and CS tuners or a TV incorporating BS and CS tuners therein). For terrestrial broadcasting service, a signal of a radio-frequency band received by a UHF antenna 7 and that received by a VHF antenna 8 are mixed (or remain independent from each other) and then transmitted via a coaxial cable 9 to an each room's TV receiver 6.

FIG. 18 shows a configuration of a TV broadcast receiving system 1000 in a community house. As shown in FIG. 18, an electronic wave broadcast from a satellite is received by a common, receiving BS antenna 11 and a common, receiving CS antenna 12 and converted in an intermediate-frequency band of one to two GHz. Of the converted, satellite-broadcast BS and CS signals, the CS signal is converted in frequency by a block converter 13. Then the signals are mixed with VHF and UHF signals of terrestrial broadcasting waves and thus transmitted via a single coaxial cable 14. The signal transmitted via coaxial cable 14 is passed via a distributor 15 and an amplifier 16 and thus distributed to each household and each room through a cable.

In individual houses, however, transmission to a plurality of TV receivers renders wiling complicated. In community houses, by contrast, all broadcast waves are transmitted to each household via a single coaxial cable 14, although the number of TV receivers installed is limited due to a distributor set previously and an additional distributor is thus required when a TV receiver is additionally installed.

SUMMARY OF THE INVENTION

One object of the invention is to provide a milliwave transmitting and receiving system for indoor, milliwave, wireless transmission of satellite broadcasting service (BS, CS) and terrestrial broadcasting service (VHF, UHF), eliminating complex wiling.

Another object of the present invention is to provide milliwave transmitting and receiving devices for implementing the milliwave transmitting and receiving system.

The invention is a milliwave transmitting device for indoor, milliwave, wireless transmission, including a broadcast-wave receiving circuit, a modulation circuit and a milliwave transmitting circuit.

The broadcast-wave receiving circuit receives a plurality of broadcast waves and converts the waves into broadcast signals respectively corresponding to the waves. The modulation circuit up-converts a broadcast signal into a milliwave for indoor transmission and reception. The milliwave transmitting circuit transmits an up-converted milliwave.

In another aspect of the invention, there is provided a milliwave receiving device for indoor, milliwave, wireless transmission, including a milliwave receiving circuit and a broadcast-wave demodulation circuit.

The milliwave receiving circuit receives a milliwave up-converted from a plurality of broadcast waves and thus transmitted and received indoors. The broadcast-wave demodulation circuit down-converts a milliwave in a frequency band of a broadcast wave.

In still another aspect of the invention, there is provided a milliwave transmitting and receiving system for indoor, milliwave, wireless transmission, including a milliwave transmitting device and a milliwave receiving device.

The milliwave transmitting device transmits a milliwave signal through wireless milliwave transmission. The milliwave transmitting device includes a broadcast-wave receiving circuit receiving and converting a plurality of broadcast waves into broadcast signals respectively corresponding to the broadcast waves, a modulation circuit up-converting a broadcast signal in a milliwave for indoor transmission and reception, and a milliwave transmitting circuit transmitting an up-converted milliwave.

The milliwave receiving device receives a milliwave signal through milliwave, wireless transmission. The milliwave receiving device includes a milliwave receiving circuit receiving a milliwave from the milliwave transmitting circuit, and a broadcast-wave demodulation circuit down-converting a milliwave in a frequency band of a broadcast wave.

The invention can advantageously eliminate indoor wiring, such as coaxial cable, to wirelessly transmit a broadcast wave in a milliwave. Thus, antenna works are not required for each additional installation of a TV video receiver and the like, and complex wiring can also be dispensed with. Thus, a miniature TV, a personal computer or video camera with a TV tuner, and the like can be used at any place indoors.

Another advantage of the invention is that transmission and reception can be provided from a single transmitting device to a plurality of receiving devices.

The foregoing and other objects, features, aspects and advantages of the present invention will become more apparent from the following detailed description of the present invention when taken in conjunction with the accompanying drawings.

DESCRIPTION OF THE DRAWINGS

FIG. 9A partially showing a configuration of a milliwave transmitting device 20, FIG. 9B partially showing a configuration of a milliwave receiving device 21.

FIGS. 16A–16C represent signal levels at various portions in the ninth embodiment, FIG. 16A representing a signal level at an input portion Pa, FIG. 16B representing a signal level from an amplifier for IF output level adjustment, and FIG. 16C representing a signal level from an IF amplifier for frequency compensation.

DESCRIPTION OF THE PREFERRED EMBODIMENTS

First Embodiment

Figure 1:
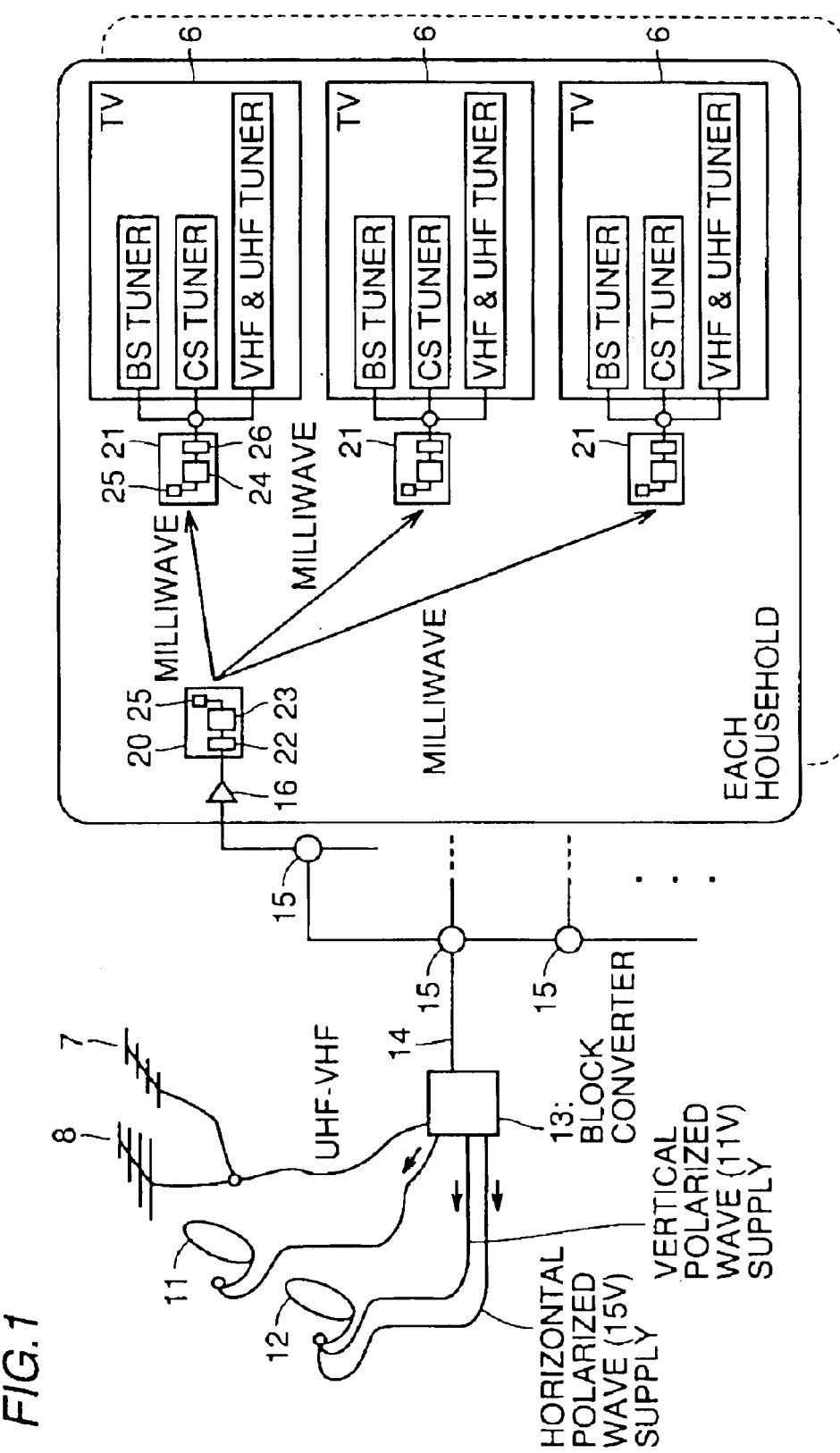
FIG. 1 shows a milliwave, wireless-transmission, TV receiving system 100 in a community house in accordance with the first embodiment of the invention.
Figure 17:
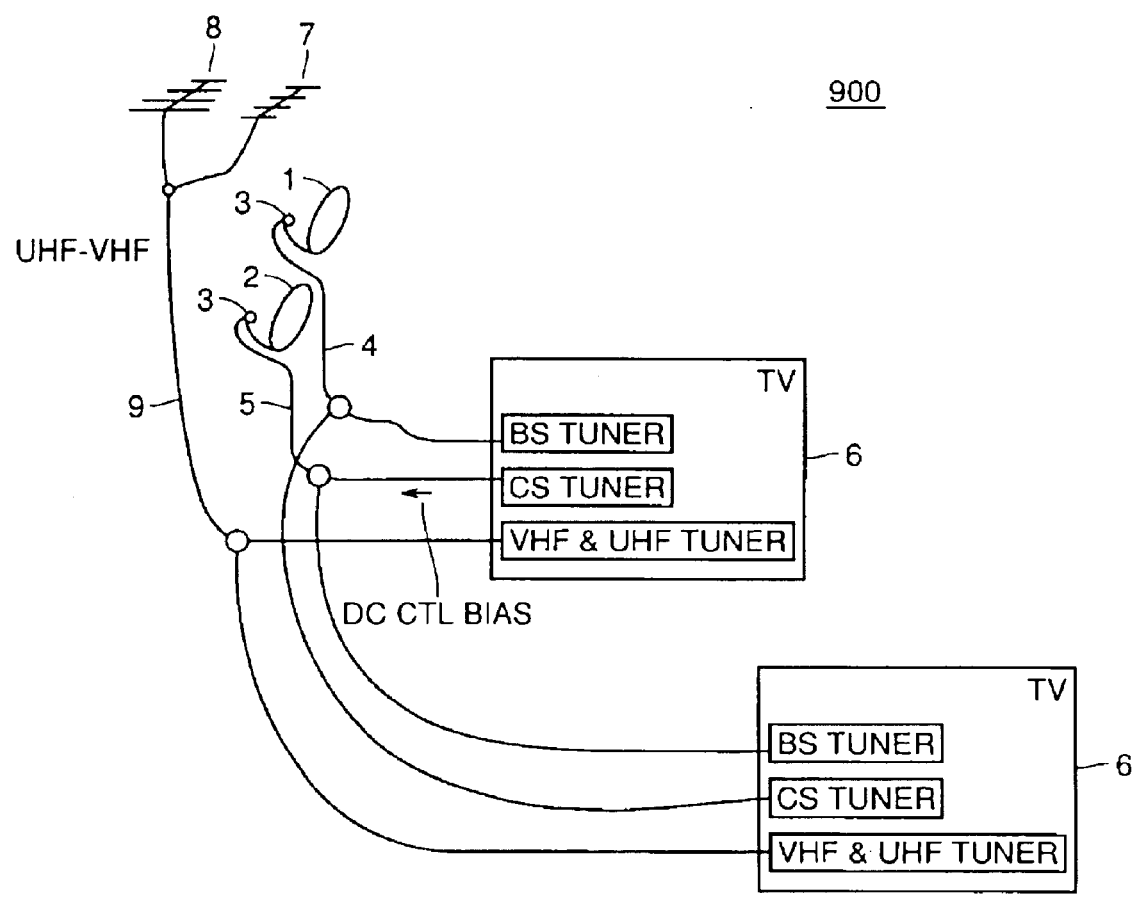
FIG. 17 shows a conventional TV broadcast receiving system 900 in an individual house.
Figure 18:
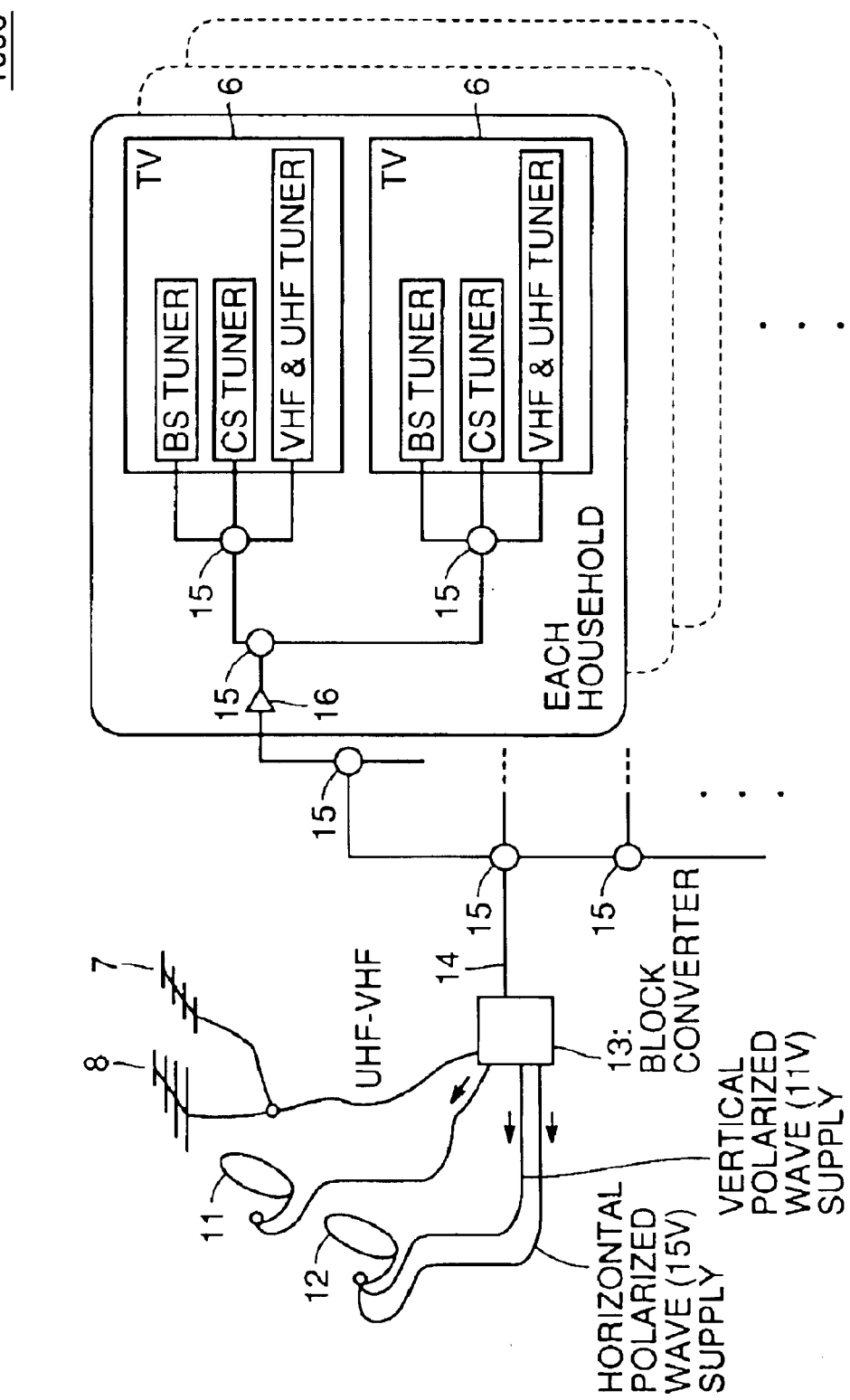
FIG. 18 shows a conventional TV broadcast receiving system 1000 in a community house.

FIG. 1 shows a milliwave, wireless-transmission, TV receiving system 100 in a community house in accordance with a first embodiment of the invention. The identical and similar portions to those of the FIGS. 17 and 18 conventional examples are denoted by same reference characters.

Milliwave, wireless-transmission, TV receiving system 100 employs a milliwave of a frequency band of 60 GHz for the indoor, wireless system. A milliwave of the 60 GHz band is significantly higher in frequency and allows a radio-wave bandwidth of a transmitter and receiver to be wider than currently used-satellite and terrestrial TV broadcast waves so that terrestrial broadcasting service and satellite broadcasting service can be collectively radio-transmitted at one time. In addition, in this frequency band radiowaves are significantly absorbed by oxygen and water and thus readily blocked between adjacent houses. This frequency band is also suitable for wireless indoor transmission in a household, since it provides a ½ wavelength of 2.5 mm in the air, approximately the same as the size of an IC chip and thus capable of integration with the IC together with its antenna, and can thus reduce the size of the equipment and allows a light-weight, miniature radio module to be incorporated into an electrical appliance.

A satellite-broadcast electronic wave is received by a common, receiving BS antenna 11 and a common, receiving CS antenna 12 and converted in an intermediate frequency band of one to two GHz. Of the converted, satellite-broadcast BS and CS signals, the CS signal is converted in frequency by a block converter 13. Then the signals are mixed with VHF and UHF signals of terrestrial broadcast waves and transmitted via a single coaxial cable 14. The signal transmitted on coaxial cable 14 is passed via a distributor 15 and an amplifier 16 and thus distributed to a milliwave transmitting device 20 in each household.

A signal from milliwave transmitting device 20 is transmitted to a milliwave receiving device 21 via an electronic wave of the milliwave band described above. FIG. 1 shows a single milliwave transmitting device 20 transmitting a signal to a plurality of milliwave receiving devices 21 (three milliwave receiving devices 21 in the present embodiment).

Milliwave transmitting device 20 includes a frequency converter (referred to as a frequency arranger 22 hereinafter) arranging a plurality of TV broadcast waves along a frequency axis, an up-converter 23 converting an intermediate frequency band to a radio signal of a milliwave band, and an antenna 25.

Milliwave receiving device 21 includes antenna 25, a down-converter 24 converting a radio signal of a milliwave band into an intermediate frequency band, a frequency converter (referred to as an inverse frequency arranger 26 hereinafter) converting an intermediate frequency band arranged along a frequency axis to a normal TV broadcast wave.

Figure 2A:
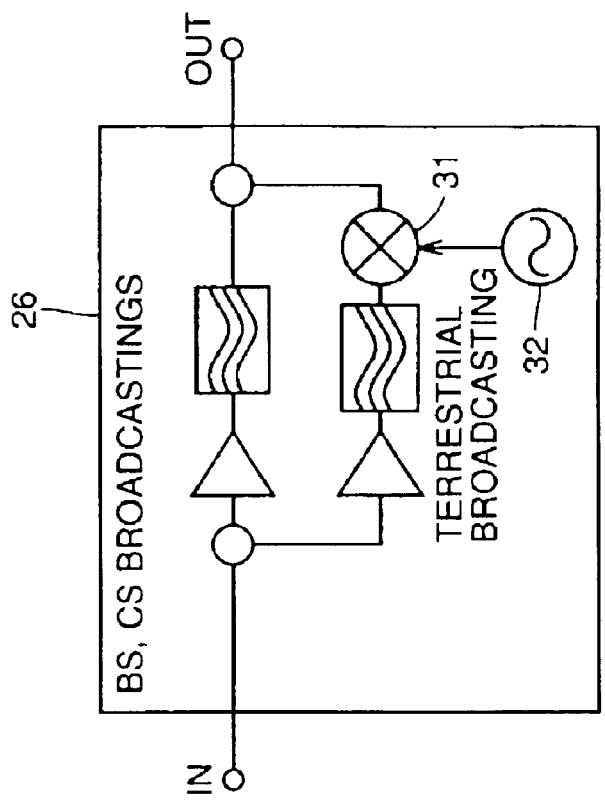
FIGS. 2A and 2B show a configuration of a frequency arranger 22 and a configuration of an inverse frequency arranger 26, respectively, of milliwave, wireless-transmission, TV receiving system 100 in a community house in accordance with the first embodiment.
Figure 2B:
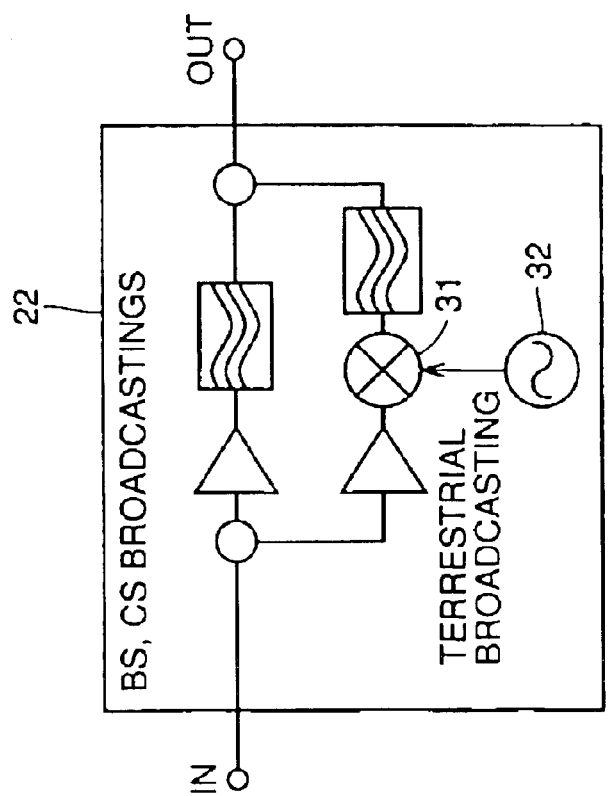

FIG. 2A shows a configuration of a frequency arranger 22 of the milliwave, wireless-transmission, TV receiving system, and FIG. 2B shows a configuration of inverse frequency arranger 26 of the milliwave, wireless-transmission, TV receiving system.

FIGS. 3A–3D show frequency arrangements when milliwave, wireless-transmission, TV receiving system 100 is used.

Reference will now be made to FIGS. 2A and 2B and 3A–3D to describe frequency arranger 22 and inverse frequency arranger 23 operations.

Figure 3A:
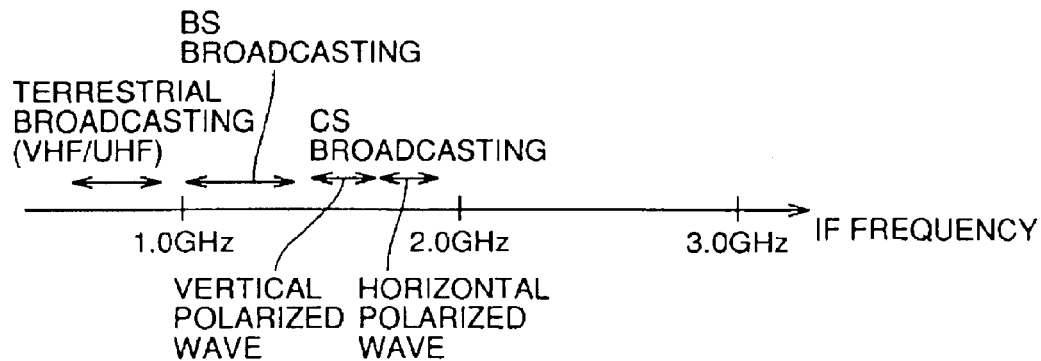
FIGS. 3A–3D show frequency arrangements when milliwave, wireless-transmission, TV receiving system 100 in a community house in accordance with the first embodiment, FIG. 3A showing a frequency arrangement of a signal input to frequency arranger 22, FIG. 3B showing a frequency arrangement of a signal output from frequency arranger 22, FIG. 3C showing a frequency arrangement up-converted by an up-converter 23 into a band of 60 GHz, FIG. 3D showing a frequency arrangement of an output from inverse frequency arranger 26.
Figure 3B:
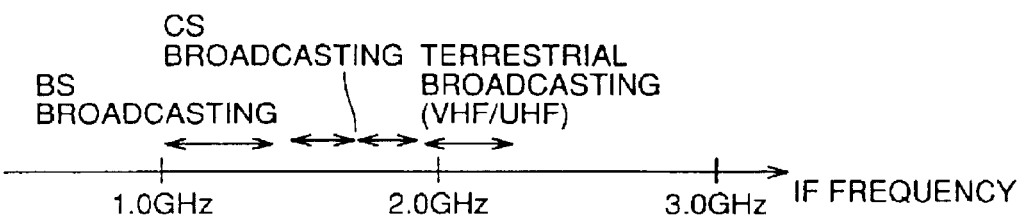

As shown in FIG. 3A, for signal inputs to frequency arranger 22 an intermediate frequency of a CS signal and that of a BS signal are previously arranged by block converter 13 along a frequency axis at an intermediate frequency of 1035 MHz to 1895 MHz. Of such input signals, the FIG. 2A frequency arranger 22 allows a frequency mixer 31 and a local oscillator 32 to convert only terrestrial broadcast signal in frequency and arrange it along the frequency axis. In other words, in the series of the frequencies of the signals output from frequency arranger 22 the terrestrial broadcast signal is converted in frequency, as shown in FIG. 3B.

A reason why a terrestrial broadcast signal is converted in frequency is as follows: when a terrestrial broadcast signal prior to the frequency conversion is up-converted to the 60 GHz band the terrestrial broadcast signal comes close to local oscillation wave (milliwave) due to the low frequency of terrestrial broadcasting service. However, the local oscillation wave is essentially an unnecessary wave which must be removed rather than radiated from antenna 25. Thus a terrestrial broadcast wave signal directly up-converted will be removed together with the local oscillation wave. Accordingly, frequency arranger 22 converts terrestrial broadcast wave into a different frequency band (e.g. a band of 2 GHz) at the intermediate-frequency stage.

Figure 3C:
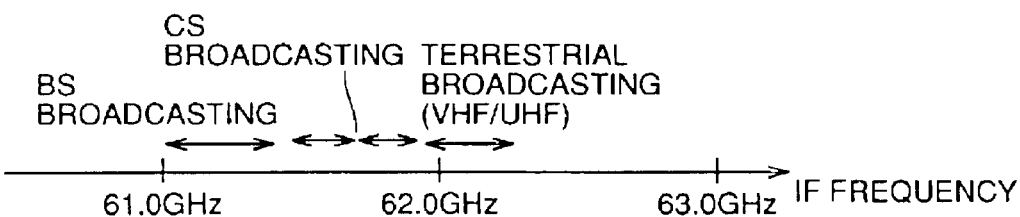

The broadcast waves thus arranged along the frequency axis are up-converted into the 60 GHz band by the milliwave transmitting device 20 up-converter 23 to have the radio frequencies as shown in FIG. 3C and thus output as a milliwave radio-signal from the milliwave transmitting device antenna 25.

Figure 3D:
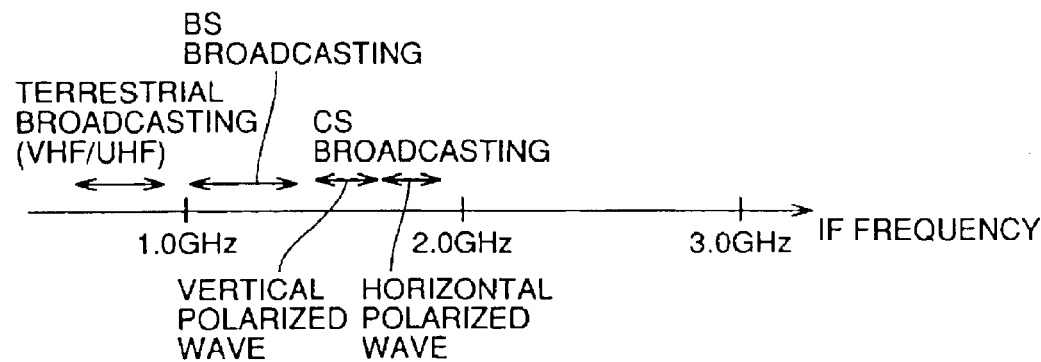

In milliwave receiving device 21, antenna 25 receives a milliwave radio signal which is in turn down-converted to a broadcast wave and thus input to inverse frequency arranger 26. As shown in FIG. 2B, inverse frequency arranger 26 provides the inverted version of the process provided by frequency arranger 22, using frequency mixer 31 and local oscillator 32 to convert an intermediate frequency arranged along a frequency axis to an original, ground -wave frequency. A relation between the frequencies of outputs from inverse frequency arranger 26 is shown in FIG. 3D.

Milliwave, wireless-transmission, TV receiving system 100 inputs a broadcast wave thus obtained to TV receiver 6 to provide for TV reception.

Since a broadcast wave can be transmitted indoors via milliwave radio-transmission without using a wiling such as a coaxial cable, antenna works are not required for each additional TV installation and complex wiring can also be dispensed with. Thus, a miniature TV, a personal computer or video camera with a TV tuner, and the like can be used at any indoor locations.

Second Embodiment

Figure 4:
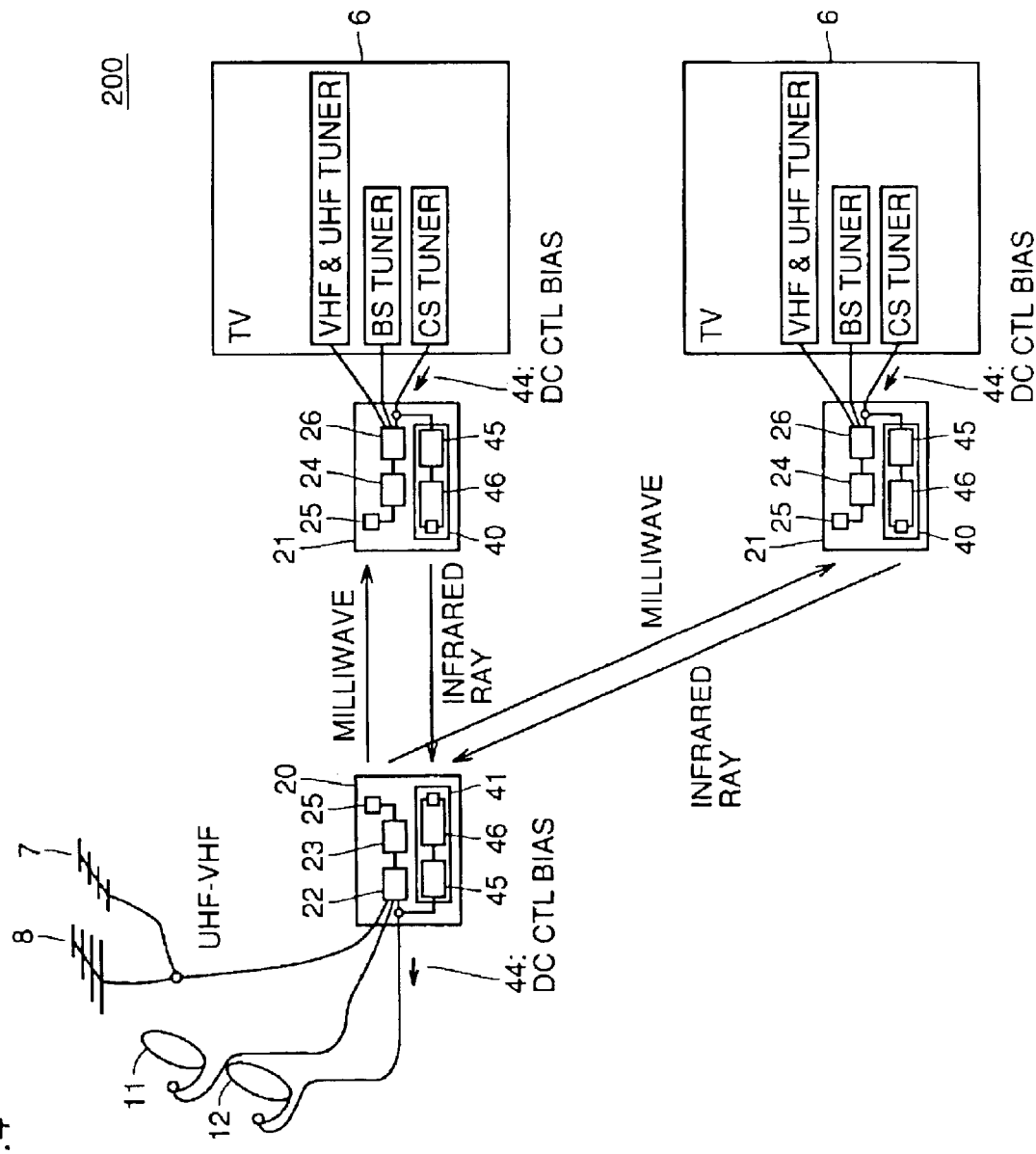
FIG. 4 shows a milliwave, wireless-transmission, TV receiving system 200 in an individual house in accordance with a second embodiment.

FIG. 4 illustrates a configuration of an indoor, milliwave, wireless-transmission, TV receiving system 200 for an individual house in accordance with a second embodiment.

Figure 5A:
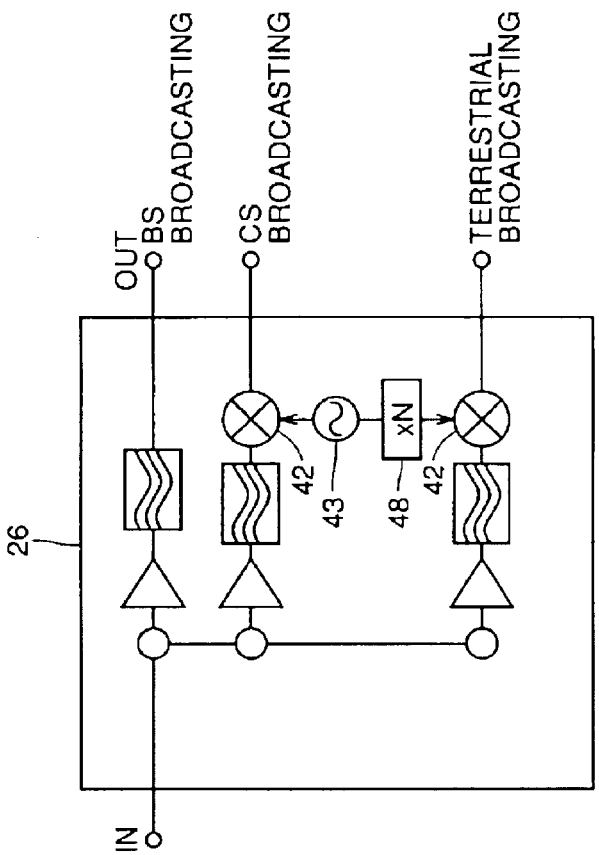
FIGS. 5A and 5B show a configuration of frequency arranger 22 and that of inverse frequency arranger 26, respectively, of milliwave, wireless-transmission, TV receiving system 200 in an individual house in accordance with the second embodiment.
Figure 5B:
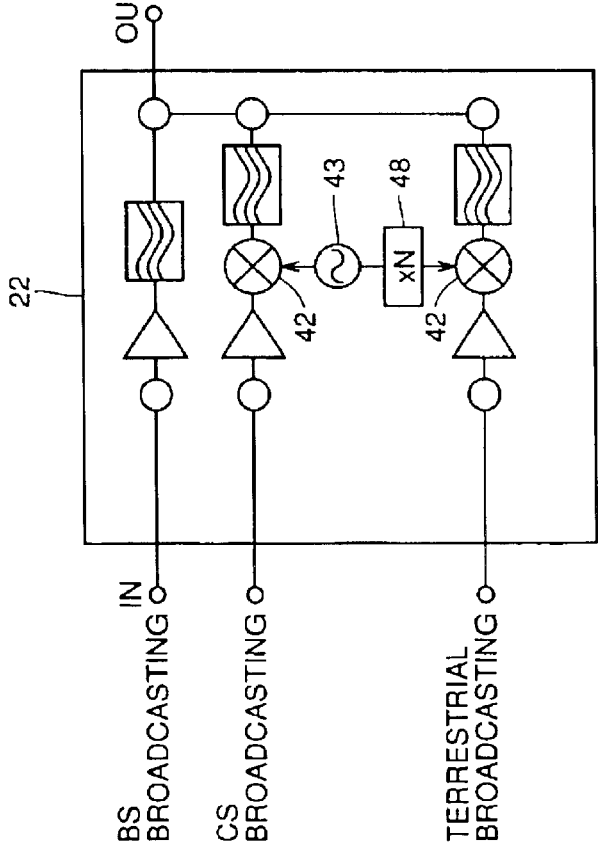

FIGS. 5A and 5B show a configuration of frequency arranger 22 and that of inverse frequency arranger 23, respectively, of milliwave, wireless-transmission, TV receiving system 200 in the second embodiment.

Figure 6A:
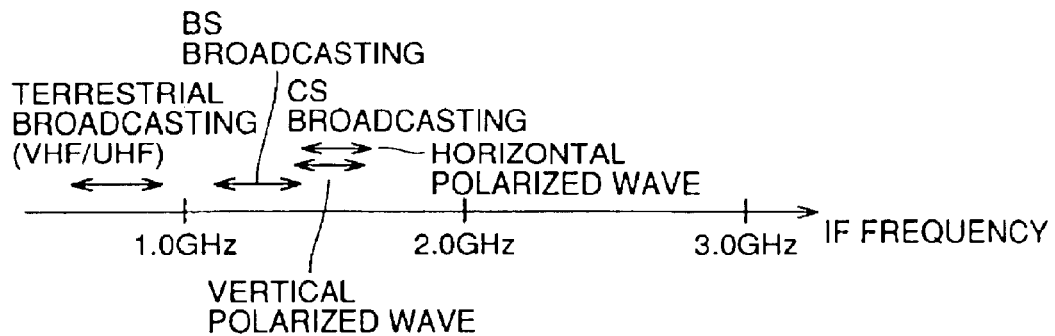
FIGS. 6A–6C show frequency arrangements when milliwave, wireless-transmission, TV receiving system 200 as the second embodiment is used, Fig. 6A showing a frequency arrangement when a block converter is not used, FIG. 6B showing a frequency arrangement converted in frequency by frequency arranger 22, FIG. 6C showing a frequency arrangement converted in frequency by inverse frequency arranger 26.
Figure 6B:
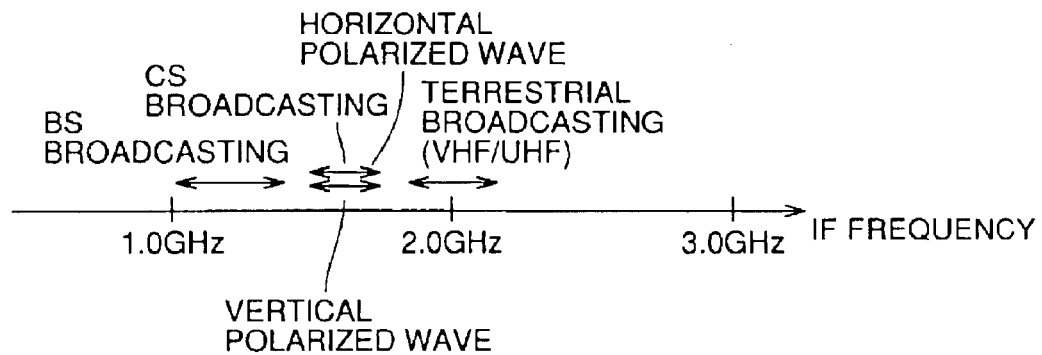
Figure 6C:
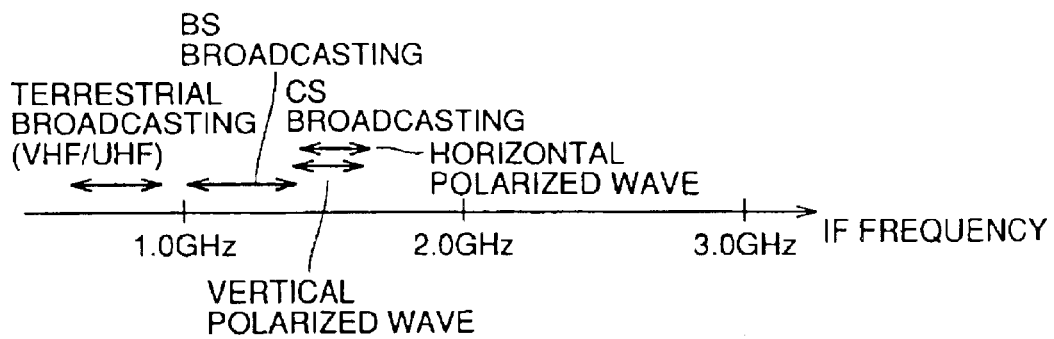

FIGS. 6A–6C show frequency arrangements when milliwave, wireless-transmission, TV receiving system 200 is used.

Hereinafter, the identical and similar portions to those shown in FIG. 1 are denoted by same reference characters and different portions are only described. Reference will now be made to FIG. 4 to FIGS. 6A–6C to describe a configuration and operation of milliwave, wireless-transmission, TV receiving system 200.

FIG. 4 shows transmission from a single milliwave transmitting device 20 to a plurality of milliwave receiving devices 21 (two milliwave receiving devices 21 in the present embodiment). Milliwave transmitting device 20 and milliwave receiving device 21 are basically similar in configuration to those of the first embodiment shown in FIG. 1. As compared to the first embodiment, however, milliwave transmitting device 20 and milliwave receiving device 21 of the second embodiment are different in the configurations of frequency arranger 22 and inverse frequency arranger 26 and also in provision of an infrared transmission device 40 and an infrared reception device 41.

Referring to FIG. 4, for an individual house without block converter 13, signals input to frequency arranger 22 are BS, CS and ground-wave signals transmitted via three independent coaxial cables. Furthermore, an intermediate frequency component of BS (1035 MHz to 1335 MHz) and an intermediate frequency component of CS (1293 MHz to 1548 MHz) overlap each other. A CS signal has a vertical polarized wave component and a horizontal polarized wave component. One of these components is selected at a CS antenna by a DC control bias output from a CS tuner depending on channel select.

As shown in FIG. 6A, frequency components of a CS broadcast wave overlap when a block converter is not used. Accordingly, depending on the channel select from a CS tuner in the TV receiver 6 a DC control bias of 11V or 15V is produced to switch a received, polarized-wave component transmitted from CS antenna 2 (the bias of 11V for the vertical polarized-wave, the bias of 15V for the horizontal polarized-wave) to extract a desired, polarized-wave component.

Thus, frequency arranger 22 in milliwave transmitting device 20 for the individual house receives BS, CS and ground-wave signals via the respective, three independent coaxial cables, as shown in FIG. 5A.

In frequency arranger 22, an intermediate frequency of CS broadcasting is converted in frequency by a frequency mixer 42 and a local oscillator 43 and an intermediate frequency of terrestrial broadcasting is converted in frequency by frequency mixer 42, local oscillator 43 and a multiplication element 48 having a multiplication ratio N (wherein N is a natural number) and the frequencies are rearranged along a frequency axis. FIG. 6B represents an arrangement of frequencies subjected to such a frequency conversion as described above. As shown in FIG. 6B, the intermediate frequency of BS broadcasting and the converted frequency of CS broadcasting do not overlap at all and the intermediate frequency of terrestrial broadcasting is temporarily converted to a different frequency band (e.g. a band of 2 GHz).

The milliwave receiving device 21 inverse frequency arranger 26 provides a process procedure opposite to that provided by frequency arranger 22. More specifically, inverse frequency arranger 26 uses frequency mixer 42, local oscillator 43 and multiplication element 48 to convert intermediate frequencies arranged along a frequency axis to an original ground-wave frequency and the original intermediate-frequency band of a CS broadcast wave. FIG. 6C represents a frequency arrangement thus converted. Inverse frequency arranger 26 thus provides an original frequency arrangement of broadcast waves.

In addition, vertical and horizontal polarized-wave components of CS broadcasting input via CS antenna 2 for individual houses should be switched by a DC control bias 44 serving as a polarized-wave control signal for selecting one of vertical polarized-wave (11V) and horizontal polarized-wave (15V) depending on the channel select. Thus, a CS tuner of TV reception 6 inputs DC control bias 44 to infrared transmission device 40, the input DC control bias 44 is used by a signal processing portion 45 to produce a modulation signal, and an electrical/optical converter 46 transmits wirelessly from infrared transmission device 40 an infrared signal corresponding to the modulation signal.

In milliwave transmitting device 20 at infrared reception device 41, electrical/optical converter 46 extracts an electrical signal corresponding to the infrared signal and signal processing portion 45 again produces DC control bias 44 for controlling vertical and horizontal polarized waves. Thus, switching between vertical and horizontal polarized waves is provided in CS broadcasting.

The infrared-signal transmitting circuit 40 provided in each milliwave receiving device and the infrared-signal receiving circuit 41 provided in the milliwave transmitting device allow a polarized wave of a CS broadcast signal to be controlled to provide for wireless, milliwave transmission when a block converter is not used e.g. in individual houses.

Third Embodiment

Figure 7:
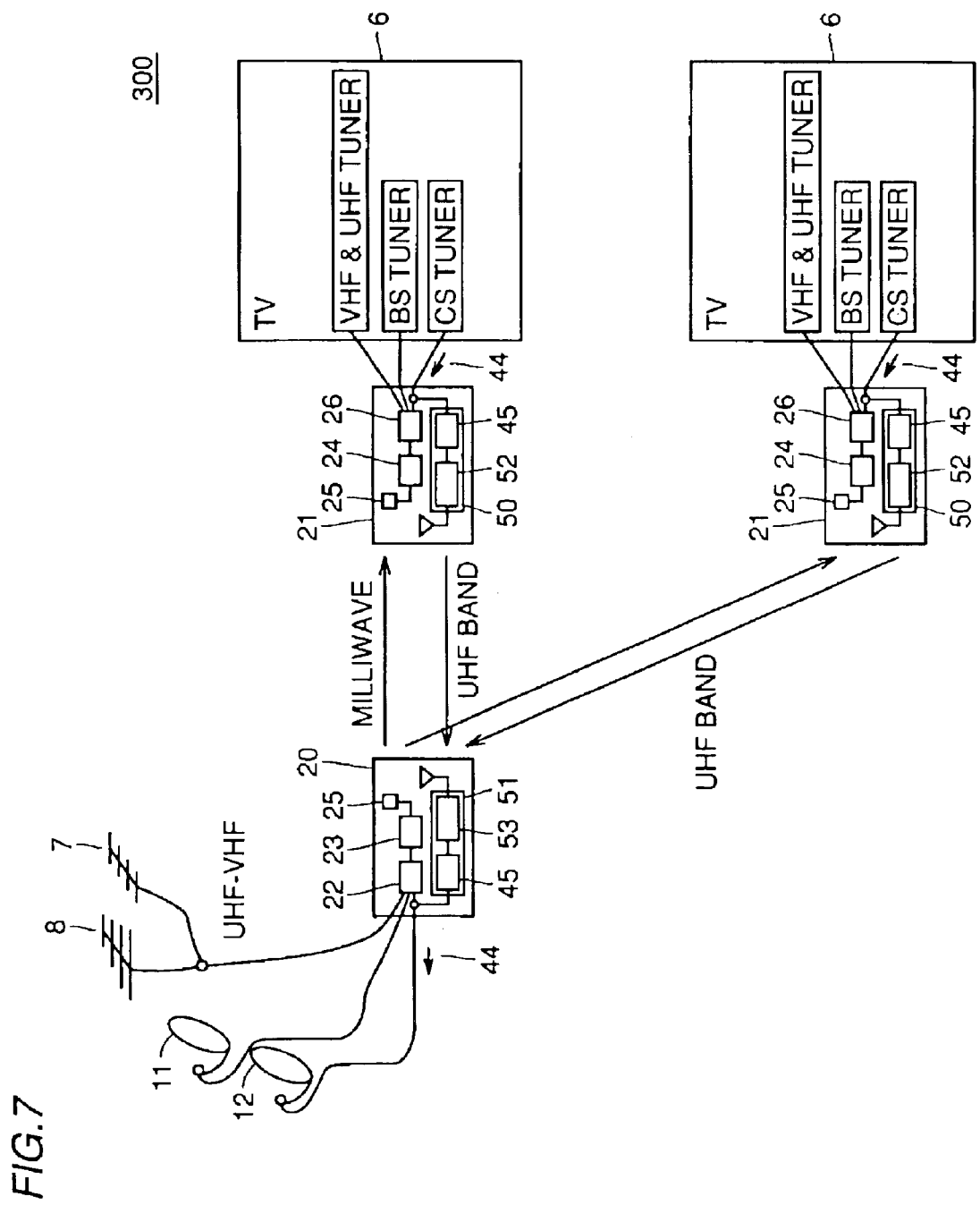
FIG. 7 shows a milliwave, wireless-transmission, TV receiving system 300 in an individual house in accordance with a third embodiment.

FIG. 7 shows a second, indoor, milliwave, wireless-transmission, TV receiving system in an individual house. Hereinafter, the identical and similar portions to those shown in the FIG. 4 second embodiment are denoted by same reference characters and description is only provided for the different portions.

FIG. 7 shows transmission from a single milliwave transmitting device 20 to a plurality of milliwave receiving devices 21 (two milliwave receiving devices 21 in this embodiment). Milliwave transmitting device 20 and milliwave receiving device 21 are basically similar in configuration to those of the second embodiment shown in FIG. 4, except that the infrared signal converted from DC control bias 44 serving as the polarized-wave control signal for switching between vertical and horizontal polarized-wave components is substituted by an electronic-wave signal of a UHF band and that milliwave transmitting device 20 and milliwave receiving device 21 are respectively provided with a UHF-band radio reception device 51 and a UHF-band radio transmission device 50. The electronic-wave signal of the UHF band is used as a signal of the ISM (Industrial Scientific Medical) band (a band of 2.4 GHz), a frequency band for cordless telephones such as PHS, and the like, so that parts and the like used for transmission and reception can be smaller and less expensive. Thus it is desirable that transmission and reception between milliwave transmitting and receiving devices 20 and 21 use the UHF band, although it may use a significantly weak electronic wave of a different electronic-wave band such as a VHF band.

UHF-band radio transmission device 50 includes signal processing portion 45 applying signal process to and thus modulating DC control bias 44 from a CS tuner of TV receiver 6, and a UHF-band radio portion 52 converting the modulated wave into a radio signal of a UHF band. UHF-band radio reception device 51 includes a UHF-band radio portion 53 converting a UHF-band radio signal into a demodulated wave, and signal processing portion 45 reproducing from the demodulated wave the DC control bias 44 of the CS tuner of TV receiver 6.

The UHF-signal transmitting circuit 50 provided in each milliwave receiving device 21 and the UHF-signal receiving circuit 51 provided in milliwave transmitting device 20 allow a polarized wave of a CS broadcast signal to be controlled to provide for wireless, milliwave transmission when a block converter is not used e.g. in individual houses. Particularly, since an electronic wave of the UHF band is dissimilar to infrared transmission, capable of transmission through such blockages as fusuma, a paper sliding door, wall and the like, milliwave transmitting and receiving devices can be used between partitioned rooms. By incorporating a cordless telephone such as PHS into the system, not only a signal for controlling vertical and horizontal polarized waves but data transmission can be advantageously provided to allow bidirectional communication.

Fourth Embodiment

Figure 8:
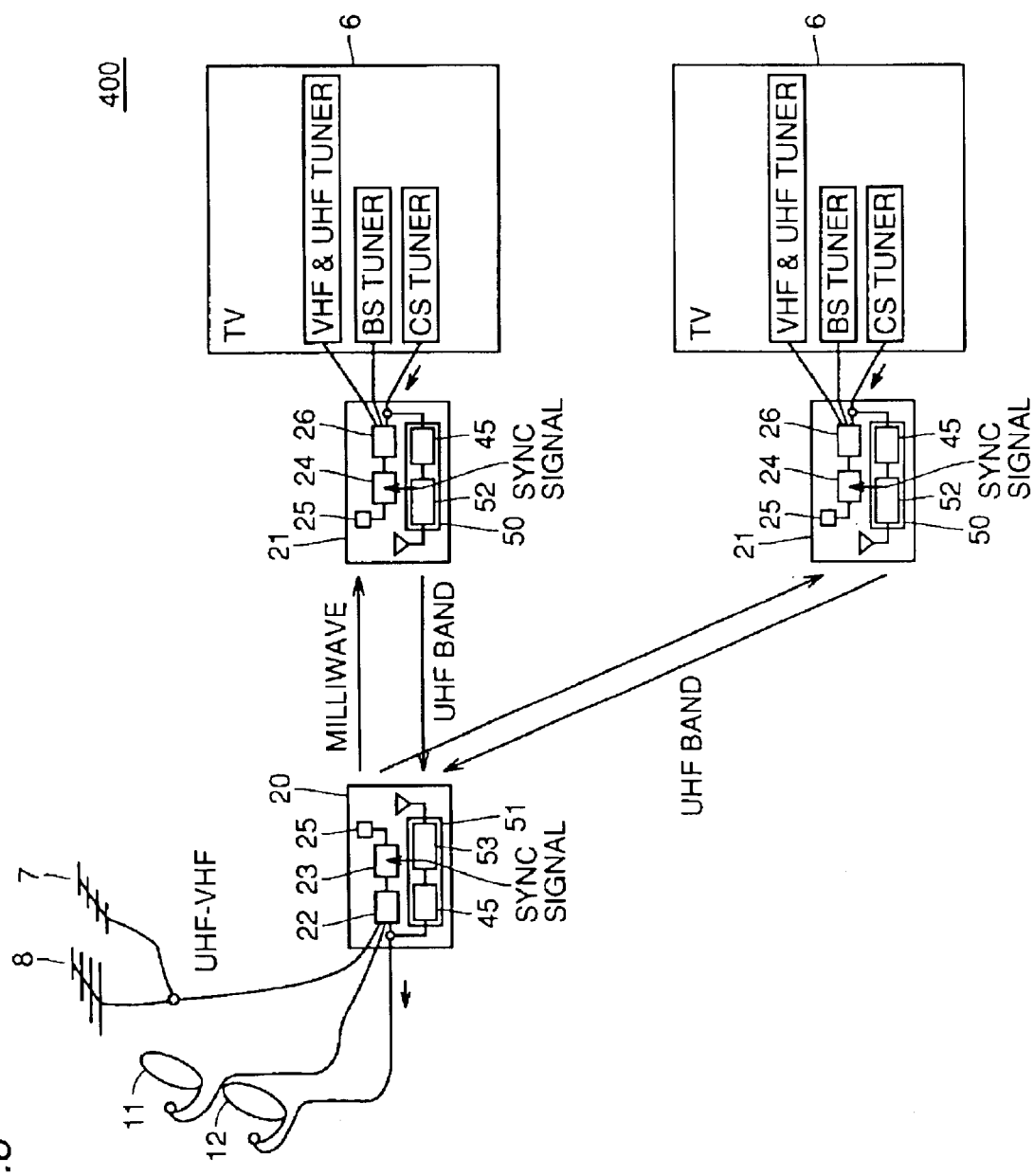
FIG. 8 shows a milliwave, wireless-transmission, TV receiving system 400 in an individual house in accordance with the fourth embodiment.

FIG. 8 illustrates an indoor, milliwave, wireless-transmission, TV receiving system 400 for an individual house in accordance with a fourth embodiment. Hereinafter, the identical and similar portions to those according to the third embodiment shown in FIG. 7 are denoted by same reference characters and the following description is only provided with respect to the different portions therebetween.

The FIG. 8 milliwave transmitting device 20 and milliwave receiving device 21 are basically similar in configuration to those of the third embodiment shown in FIG. 7, using UHF-band radio transmission and reception devices 50 and 51 of a UHF band to transmit and receive the control signal for switching between vertical and horizontal polarized-wave components.

It should be noted, however, that milliwave, wireless-transmission, TV receiving system 400 of the present embodiment differs in configuration from milliwave, wireless-transmission, TV receiving system 300 in that in order to reliably operate milliwave transmitting and receiving devices 20 and 21 a reference signal of UHF-band radio portions 52 and 53 is used to contemplate the stabilization and noise reduction of a local oscillation signal of milliwave transmitting and receiving devices 20 and 21.

FIGS. 9A and 9B partially show the configurations of milliwave transmitting and receiving devices 20 and 21 used in the present embodiment. The identical and similar portions thereof to those shown in FIG. 5 are denoted by same reference characters.

Referring to FIGS. 9A and 9B, in milliwave transmitting device 20 at UHF-band radio portions 52 and 53, a UHF-band local oscillator 61 is constituted by a phase lock oscillator (a phase locked loop circuit) driven by a crystal oscillator 62. More specifically, a phase difference between an output signal of a frequency divider 612 receiving an output from a voltage controlled oscillator VCO and an output signal of crystal oscillator 62 is used by a low pass filter LPF to produce a control voltage which controls an oscillation frequency of voltage controlled oscillator VCO. A local oscillation wave from UHF-band local oscillator 61 is used to modulate and demodulate a UHF signal.

As shown in FIG. 9A, in milliwave transmitting device 20 a signal from UHF-band local oscillator 61 is guided to a harmonic amplifier 63 of up-converter 23. Harmonic amplifier 63 amplifies a harmonic component of the signal from UHF-band local oscillator 61 and injects it to a milliwave, local oscillator 64 to provide synchronization of milliwave, local oscillator 64 oscillation. A similar configuration is also provided in the FIG. 9B milliwave receiving device 21.

While the present embodiment employs an injection and synchronization system of a local oscillation wave to milliwave, local oscillator 64, UHF-band local oscillator 61 (or crystal oscillator 62 in UHF-band local oscillator 61), and a milliwave harmonic mixer, a phase comparator, a frequency divider, a loop filter and the like may be used to configure a feed back loop circuit and milliwave, local oscillator 64 may provide facing operation.

With this configuration, a milliwave signal generated from milliwave, local oscillator 64 can have less noise component and obtain a stable frequency equivalent to the level of the crystal oscillator.

Fifth Embodiment

Figure 10A:
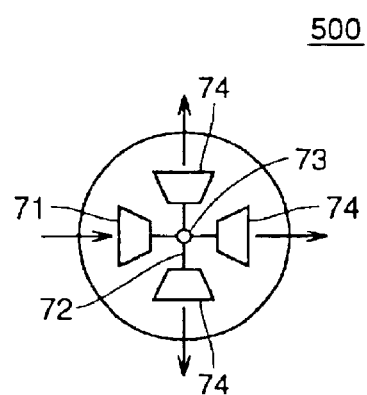
Figs. 10A and 10B illustrate a configuration of a milliwave signal distributor and relay 500 in a fifth embodiment, corresponding to a plan view and a cross section, respectively, thereof.
Figure 10B:
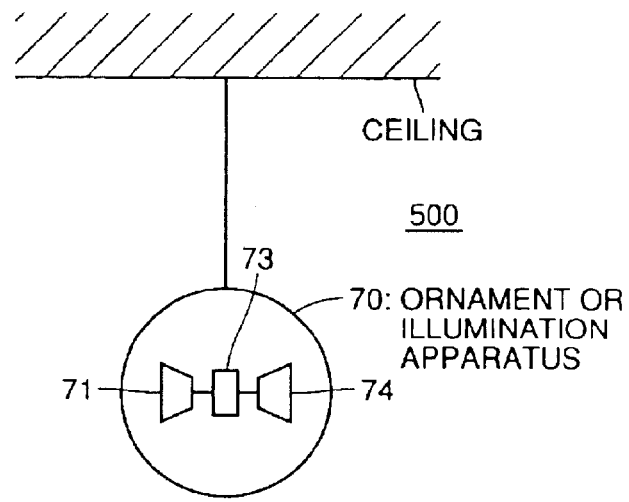

FIGS. 10A and 10B illustrate a configuration of a first milliwave signal distributor and relay 500, corresponding to a plan view and a cross section, respectively, thereof The milliwave signal distributor and relay of the present embodiment is attached to an ornament or illumination apparatus 70 suspended from a ceiling, configured by a receiving antenna 71, a signal line 72, a distributor 73 and a plurality of transmitting antennas 74. Transmitting and receiving antennas 74 and 71 are a horn antenna or a planar antenna. Signal line 70 and distributor 73 may be formed of a waveguide, a coaxial line, or a planar line, such as a microstrip line.

The operation will now be described. A milliwave signal carrying a TV broadcast wave is received by receiving antenna 71, passed via signal line 72 and distributed by distributor 73, and again radiated via a plurality of transmitting antennas 74. By directing the plurality of transmitting antennas in a plurality of directions, the milliwave signal can be efficiently relayed and distributed from a room to each other room. While in the present embodiment milliwave signal distributor and relay 500 is attached to an ornament or illumination apparatus 72, it may be attached to TV receiver 6 together with milliwave receiving device 22 or to an inner or an upper or lower portion of the electrical appliance e.g. of refrigerators, air conditioners and the like, Furthermore, at least one of the various milliwave receiving devices and milliwave transmitting devices described in the embodiments, rather than only a milliwave receiving device and a milliwave distributor and relay, may be mounted to an electrical appliance.

Sixth Embodiment

Figure 11A:
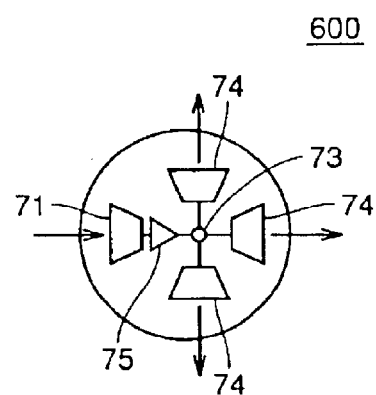
FIGS. 11A and 11B illustrate a configuration of a milliwave signal distributor and relay 600 in the fifth embodiment, corresponding to a plan view and a cross section, respectively, thereof.
Figure 11B:
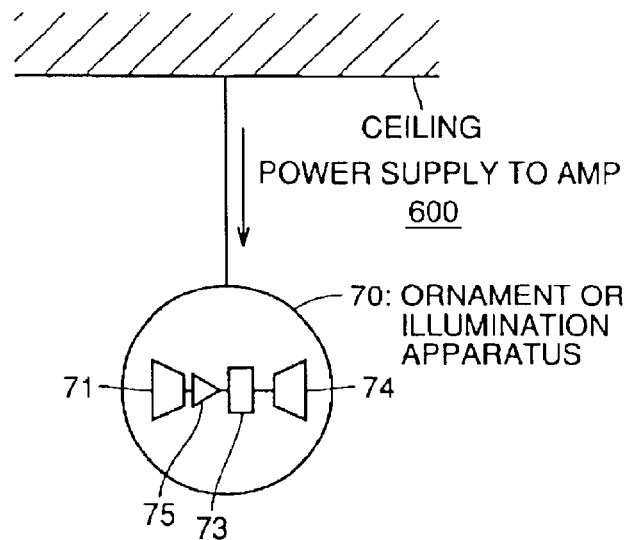

FIGS. 11A and 11B illustrate a configuration of a second milliwave-signal distributor and relay 600, corresponding to a plan view and a cross section, respectively, thereof. The distributor and relay of the present embodiment is only different from the fifth embodiment shown in FIG. 10 in having an amplifier 75.

The operation will now be described. A milliwave signal carrying a TV broadcast wave is received by receiving antenna 71, amplified by amplifier 75 and then distributed by distributor 73, and radiated via a plurality of transmitting antennas 74. By directing the plurality of transmitting antennas 74 in a plurality of directions, the milliwave signal can be efficiently relayed and distributed from a room to each room. Also, amplifying a signal which has once attenuated can result in a extended, radio-transmission section. A power supply for amplifier 75 can be obtained from a ceiling or an illumination apparatus. While in the present embodiment milliwave-signal distributor and relay 600 is attached to an ornament or illumination apparatus 70, it may be mounted to TV receiver 6 together with milliwave receiving device 22 or to an internal or an upper or lower portion of the electrical appliance e.g. of refrigerators, air conditioners and the like.

Seventh Embodiment

Figures 12A, 12B:
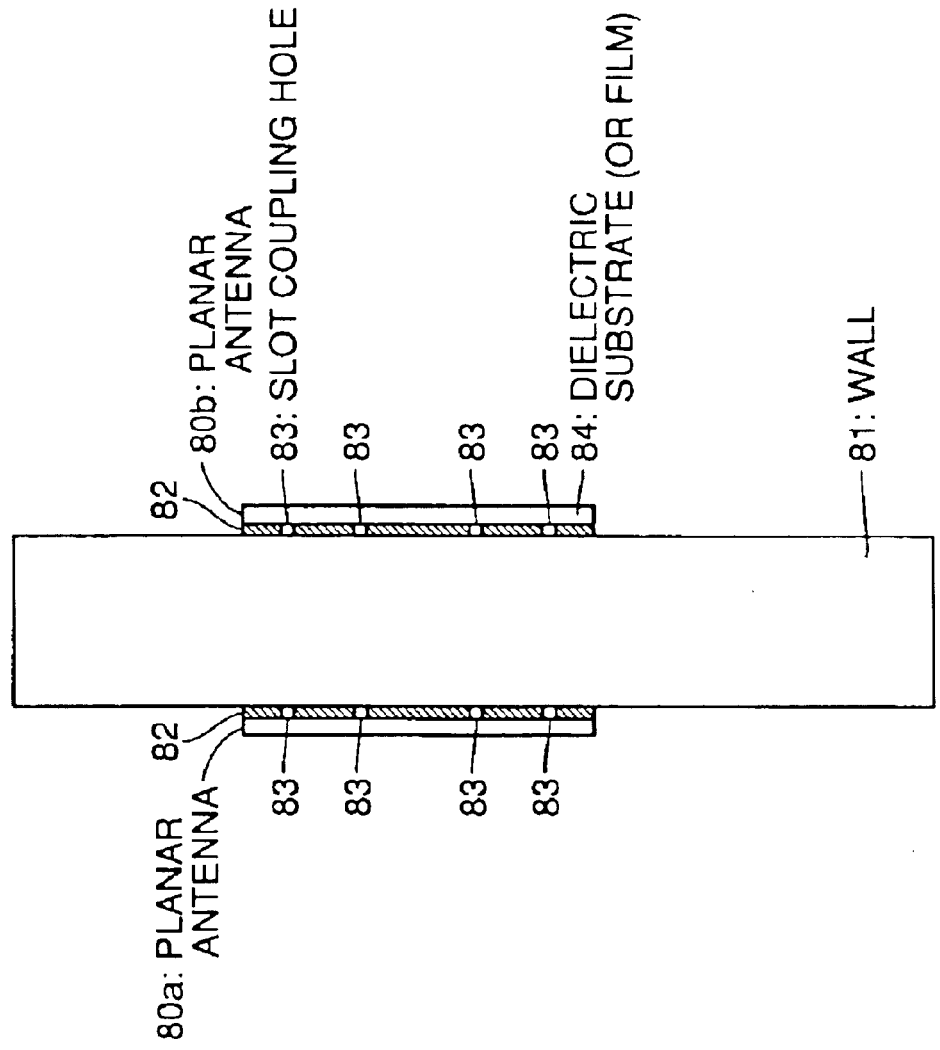
FIGS. 12A and 12B illustrate a configuration of a milliwave signal relay 700 in a seventh embodiment, corresponding to a cross section and a plan view, respectively, thereof.

FIGS. 12A and 12B illustrate a configuration of a milliwave signal relay 700, corresponding to a cross section and a plan view, respectively, thereof.

Milliwave signal relay 700 of the present embodiment includes two planar receiving and transmitting antennas 80a and 80b of 60 GHz in band opposite to each other, in contact with or stuck on a blockage 81, such as an indoor wall, door or the like. Planar antenna 80 is formed on a dielectric substrate or dielectric film 84 and has a rear surface provided with a grounding conductor 82 as a slot coupling hole 83.

Slot coupling hole 83 is constructed behind a patch conductor 85 shown in FIG. 12B, and two planar antennas 80a and 80b are arranged opposite to each other. While the present embodiment uses a plurality of slot coupling holes 83, each of patch conductors 85 on the planar antenna 80 (80a or 80b) can be formed as a microstrip line and all of them can be converted and collectively coupled to a single slot line in a single slot coupling hole of the planar antenna 80. Thus the patch conductor 85 on the planar antenna 80a can be electrically coupled to those on the planar antenna 80b by the single slot line extending through the single slot coupling holes of the planar antenna 80a and 80b. Furthermore, a planar antenna may be a slot antenna.

The operation will now be described. A milliwave signal carrying a TV broadcast wave is received by planar antenna 80a and guided to slot coupling hole 83. The plurality of slot coupling holes 83 operate as a slot antenna to radiate a received milliwave signal into blockage 81 such as a wall.

The milliwave signal is transmitted through the wall if the wall does not contain much water. (If the wall contains much water the milliwave signal is absorbed by the water.) The transmitted milliwave signal is received by the slot antenna of slot coupling holes 83 of planar antenna 80b, guided to the patch conductor 85 side of planar antenna 80b, and again radiated therefrom.

A milliwave-band (the 60 GHz band in particular) antenna provides a ½ wavelength of 2.5 mm and patch conductor 85 would each have a width of approximately 2.5 mm, so that it can be constructed with a dielectric substrate or dielectric film 84 of approximately three square centimeters. A relay thus constructed allows reliable wireless transmission between rooms partitioned by a wall. Thus, a milliwave signal relay allows transmission and reception from a single transmitting device to a plurality of receiving devices and, particularly, transmission and reception through blockages such as walls, fusumas and the like.

Eighth Embodiment

Figure 13A:
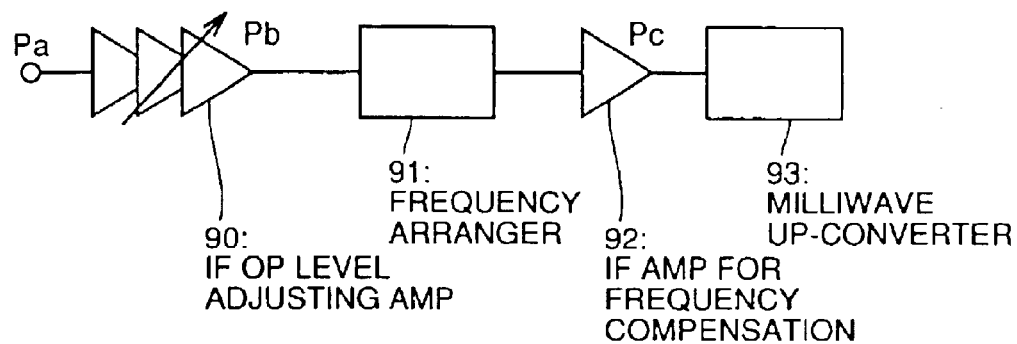
FIGS. 13A and 13B show configurations of a milliwave transmitting and receiving device used in a community house with a block converter used and in an individual house, respectively.
Figure 13B:
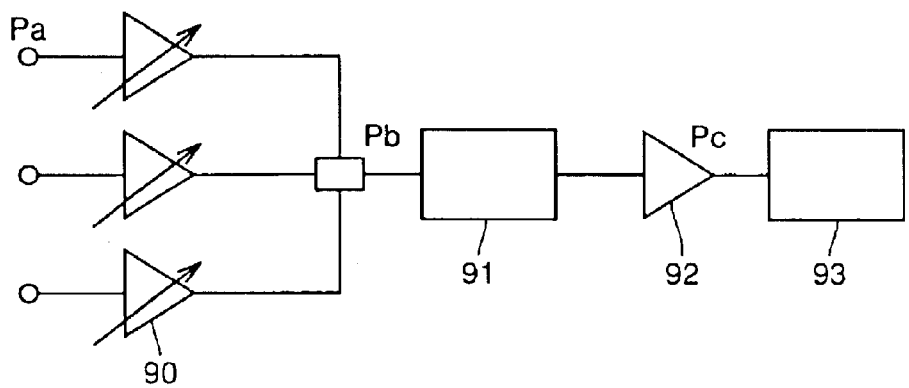

FIGS. 13A and 13B show another embodiment of milliwave transmitting device 20. FIGS. 13A and 13B show configurations in a community house with a block converter used and in an individual house, respectively.

Milliwave transmitting device 20 according to the eighth embodiment includes an IF output level adjusting amplifier 90 receiving a broadcast signal from an antenna, a frequency arranger 91, an IF amplifier 92 for frequency compensation, and a milliwave up-converter 93. It should be noted that in FIGS. 13A and 13B, an input portion of IF output level adjusting amplifier 90 is labeled Pa, an input portion of the frequency arranger is labeled Pb, and an input portion of the milliwave up-converter is labeled Pc.

When block converter 13 is used in a community house, a signal is provided on a single coaxial cable. Accordingly amplification is provided serially for each frequency band to adjust the level of an output signal. In individual houses, various broadcast-wave signals are distributed on a plurality of respective cables and the signals are amplified in parallel for each frequency.

Figure 14A:
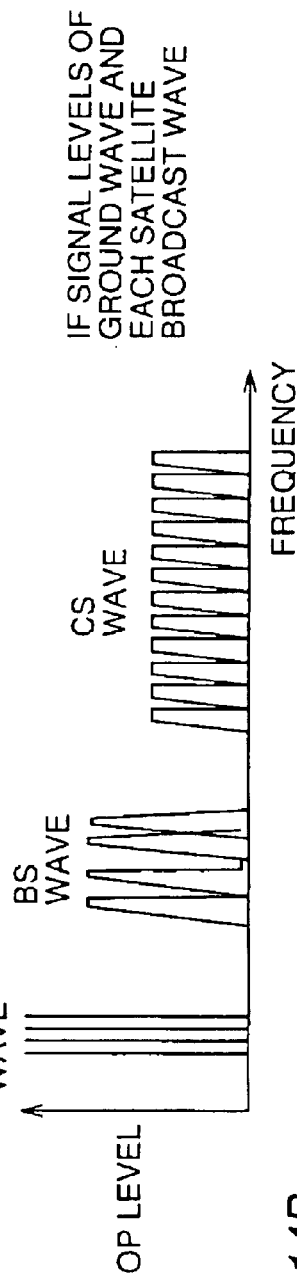
FIGS. 14A–14C represent signal levels at various portions in the eighth embodiment, FIG. 14A representing a signal level at an input portion Pa, FIG. 14B representing a signal level from an amplifier for IF output level adjustment, FIG. 14C representing a signal level from an IF amplifier for frequency compensation.
Figure 14B:
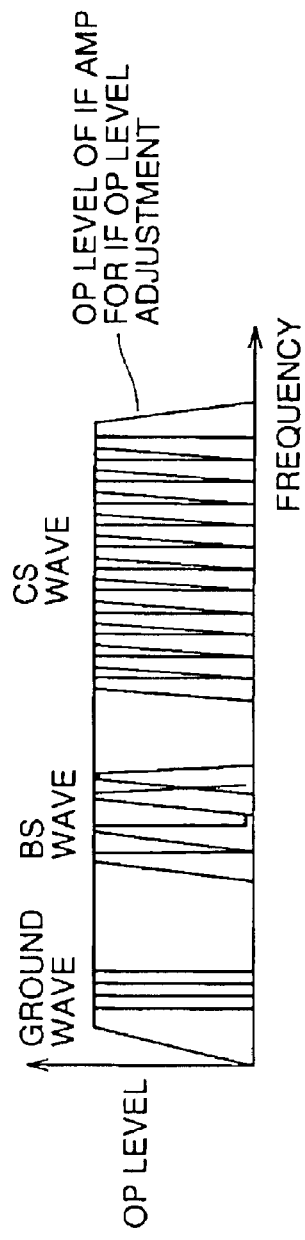
Figure 14C:
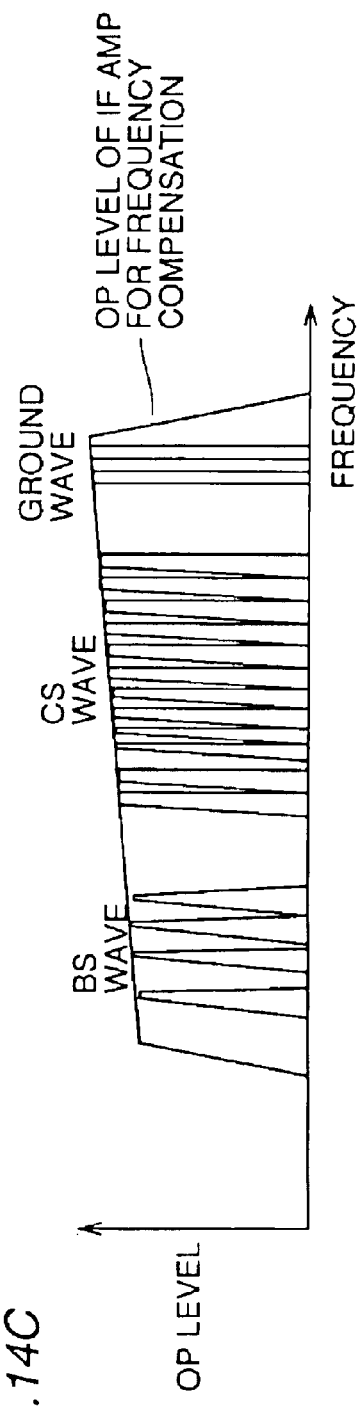

FIGS. 14A–14C represent respective signal levels of the various portions Pa, Pb and Pc of milliwave transmitting device 20. Reference will now be made to FIGS. 14A–14C to describe an operation of the milliwave transmitting device of the present embodiment.

Input broadcast-waves, such as ground wave, BS wave, CS wave, are input to IF output level adjusting amplifier 90.

FIG. 10A represents a signal level at input portion Pa, each type of broadcast-wave with a different level output from the antenna. Since the output level varies depending on the type of broadcast-wave, and the receiving area, the gain of the antenna used and the like, IF output level adjusting amplifier 90 provides amplification with different gains associated with the respective receiving bandwidths of various broadcast waves to provide a uniform output level. FIG. 14B represents such a uniform output signal level provided at intermediate portion Pb.

At the previous stage of the input portion of milliwave up-converter 93 is provided IF amplifier 92 for frequency compensation. In up-converting to a milliwave band, IF amplifier 92 for frequency compensation previously enhances a signal level (or elevates an output) at higher frequency band side when the signal has an IF frequency, since higher frequency band side of a milliwave band is smaller than lower frequency band side thereof in the gain of milliwave band up-converter 93 and that of the milliwave receiving device. This can compensate for transmission loss in milliwave, wireless transmission at higher frequency band side and ensure reliable, wide-band, wireless milliwave transmission. FIG. 14C represents a signal level at intermediate portion Pc, with an output level increased with frequency.

It should be noted that while the present embodiment has IF amplifier 92 for frequency compensation, IF amplifier 92 for frequency compensation is not necessarily required and it is sufficiently effective if an output from output level adjusting amplifier 90 that has such an amplification characteristic as represented in FIG. 14C is input to milliwave up-converter 93.

The configuration of the milliwave transmitting device described in the present embodiment is also applicable to a milliwave transmission and reception system having the infrared transmission and reception devices of the second embodiment and a milliwave transmitting and receiving system having the UHF-band radio transmission and reception devices of the third embodiment.

Ninth Embodiment

Figure 15A:
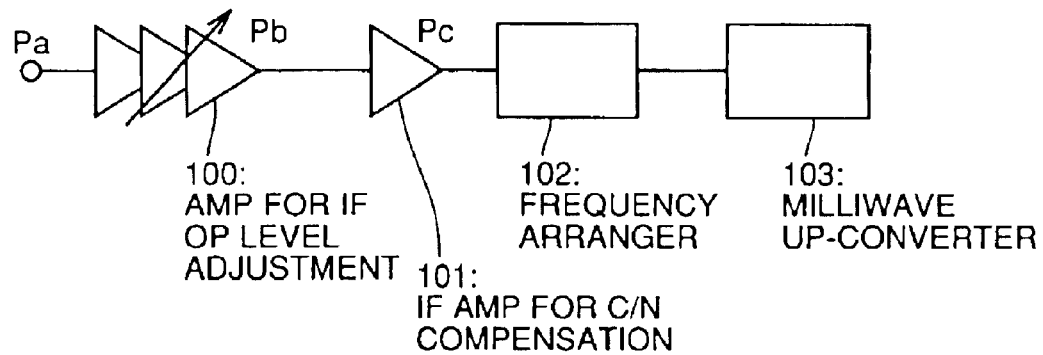
FIGS. 15A and 15B show configurations of a milliwave transmitting and receiving device in a ninth embodiment used in a community house with a block converter used and in an individual house, respectively.
Figure 15B:
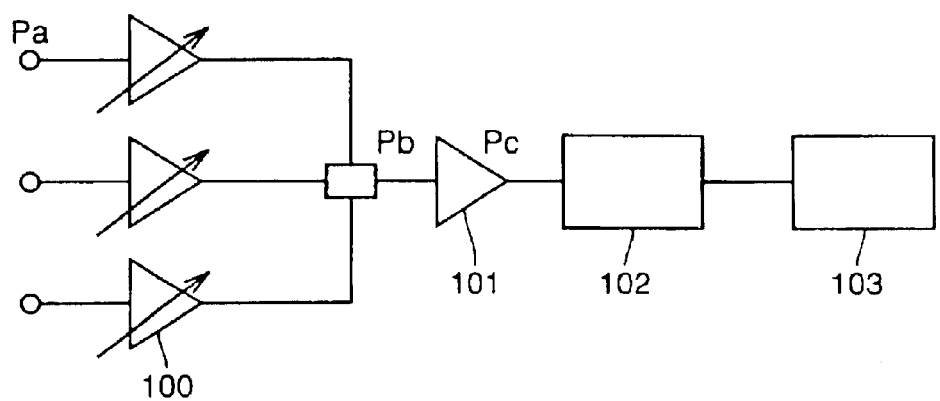

FIGS. 15A and 15B show still another embodiment of milliwave transmitting device 20, FIG. 15A showing a configuration in a community house with a block converter used, FIG. 15B showing a configuration in an individual house.

Milliwave transmitting device 20 of the ninth embodiment is formed of an IF output level adjusting amplifier 100 receiving a broadcast signal from an antenna, an IF amplifier 101 for C/N (carrier-to-noise) ratio compensation, a frequency arranger 102, and a milliwave up-converter 103. When a block converter is used in a community house, a signal is provided on a single coaxial cable. Accordingly, amplification is provided serially for each frequency band to adjust the level of an output signal. For individual houses, various broadcast signals are distributed on a plurality of respective cables and the signals are amplified in parallel for each frequency.

FIGS. 16A–16C represent respective levels at the various portions Pa, Pb and Pc of milliwave transmitting device 20. Reference will now be made to FIGS. 16A–16C to describe operation of milliwave transmitting device 20 described in the present embodiment. A broadcast wave input is input to IF output level adjusting amplifier 100. FIG. 16A represents a signal level at input portion Pa, each type of broadcast wave providing a different signal level from the antenna.

Since the signal level varies depending on the type of broadcast wave, and the signal area, the gain of the antenna used and the like, IF output level adjusting amplifier 100 provides amplification with different gains associated with the respective bandwidths of various broadcast waves to provide a uniform signal level. FIG. 16B represents a signal level provided with such a uniform output level.

At the previous stage of the input portion of milliwave up-converter 103 is provided IF amplifier 101 for C/N compensation. Since modulation system varies depending on each broadcast wave, the IF amplifier 101 for C/N compensation preferentially applies intense amplification to a type of broadcast wave requiring high C/N in demodulation and thus supplies it to milliwave up-converter 103. This allows high-quality transmission at the milliwave, wireless section. For example, a CS signal provides a smaller output from a satellite than a BS signal and requires a wide bandwidth and a high C/N for the QPS-system digital modulation. Accordingly, a linear amplifier is used to preferentially apply intense amplification to the CS signal, as compared to the PS signal level, and an up-converter is introduced in a milliwave band to allow reliable, wide-band, milliwave, wireless transmission. FIG. 16C represents a signal level at intermediate portion Pc, with a high output level at a high-frequency side.

The configuration of the milliwave transmitting device described in the present embodiment is of course applicable to a milliwave transmission and reception system with the infrared transmission and reception devices of the second embodiment and a milliwave transmission and reception system with the UHF-band radio transmission and reception devices of the third embodiment.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A milliwave transmission device for wirelessly transmitting a milliwave, comprising:
    a broadcaster-wave receiving circuit receiving a plurality of broadcast waves and converting said plurality of broadcast waves into broadcast signals respectively corresponding to said broadcast waves; and
    a modulation circuit up-converting said broadcast signal into a milliwave for transmission and reception;

a milliwave transmitting circuit transmitting said milliwave such that broadcast signals corresponding to said plurality of broadcast waves are collectively transmitted at one time; and at least one of a first amplifier provided between said broadcast-wave receiving circuit and said modulation circuit for providing a uniform output level of said broadcast signals, a second amplifier provided between said broadcast-wave receiving circuit and said modulation circuit for providing a higher output level of said broadcast signals on a high-frequency side than on a low-frequency side, and a third amplifier provided between said broadcast-wave receiving circuit and said modulation circuit for selectively enhancing among said broadcast waves an output level of a broadcast wave having a required C/N, as compared to another of said broadcast waves.

2. The milliwave transmission device according to claim 1, wherein said milliwave is an electronic wave of a frequency band of 60 GHz.

3. The milliwave transmission device according to claim 1, wherein said broadcast signal includes at least one of a signal of a radio frequency band of terrestrial broadcasting and a signal of an intermediate frequency band of satellite broadcasting.

4. The milliwave transmission device according to claim 3, wherein said broadcast-wave receiving circuit includes a frequency arranging circuit converting a frequency of said broadcast signal to eliminate an overlap of respective frequency bands of a plurality of broadcast signals respectively corresponding to said plurality of broadcast waves and to separate said frequency bands from a frequency of said milliwave by a predetermined frequency.

5. The milliwave transmission device according to claim 1, further comprising a reception circuit receiving a signal having the frequency different from milliwave-band and converted from a polarized-wave control signal of a TV receiver to reproduce a polarized-wave control signal.

6. The milliwave transmission device according to claim 1, wherein
said reception circuit is infrared-signal reception circuit.

7. The milliwave transmission device according to claim 1, wherein
said reception circuit is a UHF-band radio reception circuit.

8. The milliwave transmission device according to claim 7, wherein:
said modulation circuit includes a first local oscillator for up-converting to said milliwave; and
said UHF-band radio reception circuit includes a second local oscillator for receiving and demodulating said UHF radio signal, and means synchronizing said second local oscillator and said first local oscillator mutually.

9. A milliwave reception device, having a transmission device utilizing a frequency different from milliwave-band, for wirelessly receiving a milliwave indoors, comprising:
a milliwave receiving circuit for receiving a milliwave transmitted and received indoors such that broadcast signals corresponding to a plurality of broadcast waves are collectively received at one time;
a broadcast-wave demodulation circuit down-converting said milliwave into a frequency band of a broadcast wave; and a transmission circuit for transmitting signals at the frequency different from milliwave-band in order to control a polarized wave of at least one of the broadcast signals collectively received.

10. The milliwave reception device according to claim 9, wherein said milliwave is an electronic wave of a frequency band of 60 GHz.

11. The milliwave reception device according to claim 9, wherein
said transmission circuit is an infrared-signal transmission circuit.

12. The milliwave reception device according to claim 11, wherein said infrared-signal transmission circuit transmitting a polarized-wave control signal of a TV receiver as an infrared signal.

13. The milliwave reception device according to claim 9, wherein
said transmission circuit is a UHF-band radio transmission circuit.

14. The milliwave reception device according to claim 13, wherein
said UHF-band radio transmission circuit modulating a polarized-wave control signal of a TV receiver into a UHF radio signal for transmission.

15. The milliwave reception device according to claim 14, wherein:
said broadcast-wave demodulation circuit includes a first local oscillator for up-converting to said milliwave; and
said UHF-band radio transmission circuit includes a second local oscillator for modulating and transmitting said UHF radio signal, and circuit synchronizing said second and first local oscillators mutually.

16. A milliwave transmitting and receiving system for wirelessly transmitting a milliwave, comprising:
a milliwave transmission device for transmitting a milliwave signal in the wireless milliwave transmission, said milliwave transmission device including
a broadcast-wave receiving circuit receiving a plurality of broadcast waves and converting said plurality of broadcast waves to broadcast signals respectively corresponding to said broadcast waves,
a modulation circuit up-converting said broadcast signal into a milliwave for transmission and reception,
a milliwave transmission circuit transmitting said milliwave such that broadcast signals corresponding to said plurality of broadcast waves are collectively transmitted at one time,
and
at least one of a first amplifier provided between said broadcast-wave receiving circuit and said modulation circuit for providing a uniform output level, of said broadcast signals,
a second amplifier provided between said broadcast-wave receiving circuit and said modulation circuit for providing a higher output level of said broadcast signals on a high-frequency side than on a low-frequency side, and
a third amplifier provided between said broadcast-wave receiving circuit and said modulation circuit for selectively enhancing among said broadcast waves an output level of a broadcast wave having a required C/N, as compared to another of said broadcast waves;
and a milliwave reception device for receiving a milliwave signal in the wireless milliwave transmission, said milliwave reception device including a milliwave receiving circuit for receiving a milliwave from said milliwave transmission circuit such that broadcast signals corresponding to said plurality of broadcast waves are collectively received at one time, and a broadcast-wave demodulation circuit down-converting said milliwave into a frequency band of a broadcast wave.

17. The milliwave transmitting and receiving system according to claim 16, wherein:

said broadcast-wave receiving circuit includes a frequency arranging circuit converting a frequency of said broadcast signal to eliminate an overlap of respective frequency bands of a plurality of broadcast signals respectively corresponding to said plurality of broadcast waves and to separate said frequency bands from a frequency of said milliwave by a predetermined frequency; and said broadcast-wave demodulation circuit includes an inverse frequency arranging circuit converting said broadcast signal to a demodulatable frequency of a TV receiver.

18. The milliwave transmitting and receiving system according to claim 16, further comprising a milliwave-signal distributor and relay including a receiving antenna, a distributor and a transmitting antenna.

19. The milliwave transmitting and receiving system according to claim 18, wherein said milliwave-signal distributor and relay also includes an amplifier.

20. The milliwave transmitting and receiving system according to claim 16, further comprising a milliwave-signal relay including a receiving antenna having a planar antenna formed on dielectric, a transmitting antenna having a planar antenna formed on dielectric, and a blockage with said receiving and transmitting antennas mounted thereto and positioned opposite to each other.

21. The milliwave transmitting and receiving system of claim 16, wherein said reception circuit is an infrared-signal reception circuit and said transmission circuit is an infrared-signal transmission circuit.

22. The milliwave transmitting and receiving system of claim 16, wherein said reception circuit is a UHF-band radio reception circuit and said transmission circuit is a UHF-band radio transmission circuit.

23. An indoor electrical appliance, comprising a milliwave transmission device mounted on the electrical appliance for wirelessly transmitting a milliwave indoors, said milliwave transmission device including a broadcast-wave receiving circuit receiving a plurality of broadcast waves and converting said plurality of broadcast waves into broadcast signals respectively corresponding to said broadcast waves, a modulation circuit up-converting said broadcast signal into a milliwave for indoor transmission and reception, and a milliwave transmitting circuit transmitting said milliwave.

24. An indoor electrical appliance, comprising a milliwave receiving device mounted on the electrical appliance for wirelessly receiving a milliwave indoors, said milliwave receiving device including a milliwave receiving circuit for receiving a milliwave transmitted and received indoors, a broadcast-wave demodulation circuit down-converting said milliwave into a frequency band of a broadcast wave, and a transmission circuit for transmitting signals at the frequency different from milliwave band in order to control a polarized wave of at least one of the broadcast signals collectively received.

25. A milliwave transmission device for wirelessly transmitting a milliwave, comprising:

a broadcast-wave receiving circuit receiving a plurality of broadcast waves and converting said plurality of broadcast waves into broadcast signals respectively corresponding to said broadcast waves;

a modulation circuit up-converting said broadcast signal into a milliwave for transmission and reception;

a milliwave transmitting circuit transmitting said milliwave; and at least one of a first amplifier provided between said broadcast-wave receiving circuit and said modulation circuit for providing a uniform output level of said broadcast signals, a second amplifier provided between said broadcast-wave receiving circuit and said modulation circuit for providing a higher output level of said broadcast signals on a high-frequency side than on a low-frequency side, and a third amplifier provided between said broadcast-wave receiving circuit and said modulation circuit for selectively enhancing among said broadcast waves an output level of a broadcast wave having a required C/N, as compared to another of said broadcast waves.

26. A milliwave transmitting and receiving system for wirelessly transmitting a milliwave, comprising:

a milliwave transmission device for transmitting a milliwave signal in the wireless milliwave transmission, said milliwave transmission device including a broadcast-wave receiving circuit receiving a plurality of broadcast waves and converting said plurality of broadcast waves to broadcast signals respectively corresponding to said broadcast waves, a modulation circuit up-converting said broadcast signal into a milliwave for transmission and reception, a milliwave transmission circuit transmitting said milliwave, and at least one of a first amplifier provided between said broadcast-wave receiving circuit and said modulation circuit for providing a uniform output level of said broadcast signals, a second amplifier provided between said broadcast-wave receiving circuit and said modulation circuit for providing a higher output level of said broadcast signals on a high-frequency side than on a low-frequency side, and a third amplifier provided between said broadcast-wave receiving circuit and said modulation circuit for selectively enhancing among said broadcast waves an output level of a broadcast wave having a required C/N, as compared to another of said broadcast waves;

and a milliwave reception device for receiving a milliwave signal in the wireless milliwave transmission, said milliwave reception device including a milliwave receiving circuit for receiving a milliwave from said milliwave transmission circuit, and a broadcast-wave demodulation circuit down-converting said milliwave into a frequency band of a broadcast wave.

* * * * *